(12) United States Patent
Moore et al.

(10) Patent No.: US 6,639,581 B1
(45) Date of Patent: Oct. 28, 2003

(54) FLEXURE MECHANISM FOR INTERFACE DEVICE

(75) Inventors: David F. Moore, Redwood City, CA (US); Kenneth M. Martin, Palo Alto, CA (US); Steve P. Vassallo, Palo Alto, CA (US); Louis B. Rosenberg, San Jose, CA (US)

(73) Assignee: Immersion Corporation, San Jose, CA (US)

(*) Notice: Subject to any disclaimer, the term of this patent is extended or adjusted under 35 U.S.C. 154(b) by 0 days.

(21) Appl. No.: 09/376,649

(22) Filed: Aug. 18, 1999

Related U.S. Application Data

(60) Continuation-in-part of application No. 09/140,717, filed on Aug. 26, 1998, now Pat. No. 6,201,533, which is a division of application No. 08/560,091, filed on Nov. 17, 1995, now Pat. No. 5,805,140.

(51) Int. Cl.⁷ .............................. G09G 5/00; G09G 5/08
(52) U.S. Cl. .................. 345/156; 345/161; 345/184
(58) Field of Search ............................. 345/156, 157, 345/161, 184; 463/30; 434/45, 267, 272; 74/490

(56) References Cited

U.S. PATENT DOCUMENTS

| | | |
|---|---|---|
| 3,157,853 A | 11/1964 | Hirsch |
| 3,220,121 A | 11/1965 | Cutler |
| 3,490,059 A | 1/1970 | Paulsen et al. ............... 73/133 |
| 3,497,668 A | 2/1970 | Hirsch |
| 3,795,150 A | 2/1970 | Eckhardt ..................... 74/5.4 |
| 3,517,446 A | 6/1970 | Corlyon et al. |
| 3,623,064 A | 11/1971 | Kagan |
| 3,832,895 A | 9/1974 | Strandh .................... 73/133 R |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll ......................... 340/172.5 |
| 4,148,014 A | 4/1979 | Burson ....................... 340/709 |
| 4,160,508 A | 7/1979 | Salsbury |
| 4,216,467 A | 8/1980 | Colston .................... 340/365 L |
| 4,236,325 A | 10/1980 | Hall et al. |
| 4,302,138 A | 11/1981 | Zarudiansky |

(List continued on next page.)

FOREIGN PATENT DOCUMENTS

| | | |
|---|---|---|
| EP | 0085518 A1 | 8/1983 |
| EP | 0 085 518 B1 | 8/1989 |

(List continued on next page.)

OTHER PUBLICATIONS

Snow, E., et al., "Compact Force Reflecting Hand Controller," NASA Tech Brief vol. 15, No. 4, Item 153, Apr. 1991, pp. i, 1–3, 1a–15a.

(List continued on next page.)

*Primary Examiner*—Steven Saras
*Assistant Examiner*—Amr Awad
(74) *Attorney, Agent, or Firm*—Kilpatrick Stockton LLP

(57) ABSTRACT

A flexure mechanism for an interface device that interfaces a user with a computer system. An interface device includes a manipulandum physically contacted by the user. A five-bar closed-loop mechanism is coupled to the manipulandum to provide two rotary degrees of freedom to the manipulandum. The mechanism includes members coupled to each other by flexible couplings allowing rotation of the members. In preferred embodiments, four or five of the members are coupled together by flexible couplings that allow bending, thereby forming a unitary piece, where the couplings are oriented along axes of rotation of the mechanism. A sensor senses a position of the manipulandum outputs a sensor signal, and in some embodiments actuators are coupled to the mechanism to output a force to the manipulandum in particular degrees of freedom. The manipulandum can be a joystick handle or portion of a sphere, where the device in one embodiment can be a handheld gamepad or similar controller.

37 Claims, 14 Drawing Sheets

U.S. PATENT DOCUMENTS

| | | | |
|---|---|---|---|
| 4,391,282 A | 7/1983 | Ando et al. | 128/660 |
| 4,398,889 A | 8/1983 | Lam et al. | 434/45 |
| 4,414,984 A | 11/1983 | Zarudiansky | 128/774 |
| 4,448,083 A | 5/1984 | Hayashi | 73/862.04 |
| 4,477,043 A | 10/1984 | Repperger | 244/223 |
| 4,489,304 A | 12/1984 | Hayes | 338/128 |
| 4,513,235 A | 4/1985 | Acklam et al. | |
| 4,538,035 A | 8/1985 | Pool | 200/6 A |
| 4,550,617 A | 11/1985 | Fraignier et al. | 73/862.04 |
| 4,560,983 A | 12/1985 | Williams | 340/825 |
| 4,581,491 A | 4/1986 | Boothroyd | |
| 4,599,070 A | 7/1986 | Hladky et al. | |
| 4,603,284 A | 7/1986 | Perzley | 318/568 |
| 4,604,016 A | 8/1986 | Joyce | 414/7 |
| 4,632,341 A | 12/1986 | Repperger et al. | 244/230 |
| 4,648,782 A | 3/1987 | Kraft | |
| 4,677,355 A | 6/1987 | Baumann | 318/160 |
| 4,689,449 A | 8/1987 | Rosen | 200/6 |
| 4,708,656 A | 11/1987 | De Vries et al. | |
| 4,712,971 A * | 12/1987 | Fyler | 414/744.5 |
| 4,713,007 A | 12/1987 | Alban | |
| 4,758,692 A | 7/1988 | Roeser et al. | 200/6 A |
| 4,775,289 A | 10/1988 | Kazerooni | 414/735 |
| 4,794,388 A | 12/1988 | Matthews | 340/731 |
| 4,794,392 A | 12/1988 | Selinko | |
| 4,795,296 A | 1/1989 | Jau | 414/5 |
| 4,800,721 A | 1/1989 | Cemenska et al. | 60/393 |
| 4,811,608 A | 3/1989 | Hilton | 73/862.04 |
| 4,857,881 A | 8/1989 | Hayes | 338/128 |
| 4,861,269 A | 8/1989 | Meenen, Jr. | 434/45 |
| 4,868,549 A | 9/1989 | Affinito et al. | 340/710 |
| 4,874,998 A | 10/1989 | Hollis, Jr. | 318/568.21 |
| 4,878,374 A * | 11/1989 | Nelson | 72/446 |
| 4,879,556 A | 11/1989 | Duimel | 341/20 |
| 4,891,764 A | 1/1990 | McIntosh | |
| 4,896,554 A | 1/1990 | Culver | 74/471 XY |
| 4,907,970 A | 3/1990 | Meenen, Jr. | 434/45 |
| 4,930,770 A | 6/1990 | Baker | |
| 4,934,694 A | 6/1990 | McIntosh | |
| 4,935,728 A | 6/1990 | Kley | 340/709 |
| 4,949,119 A | 8/1990 | Moncrief et al. | 364/578 |
| 4,962,448 A | 10/1990 | DeMaio et al. | 364/146 |
| 4,983,901 A | 1/1991 | Lehmer | 318/685 |
| 4,994,669 A * | 2/1991 | Stern | 250/229 |
| 5,007,300 A | 4/1991 | Siva | 74/471 XY |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,044,956 A | 9/1991 | Behensky et al. | 434/45 |
| 5,076,517 A | 12/1991 | Ferranti et al. | 244/228 |
| 5,078,152 A | 1/1992 | Bond | |
| 5,103,404 A | 4/1992 | McIntosh | 318/568.22 |
| 5,107,080 A | 4/1992 | Rosen | 200/6 |
| 5,107,719 A * | 4/1992 | Kota | 74/490 |
| 5,116,051 A | 5/1992 | Moncrief et al. | 273/448 B |
| 5,142,931 A | 9/1992 | Menahem | 74/471 XY |
| 5,143,505 A | 9/1992 | Burdea et al. | 414/5 |
| 5,146,566 A | 9/1992 | Hollis, Jr. et al. | 395/275 |
| 5,182,557 A | 1/1993 | Lang | 341/20 |
| 5,184,319 A | 2/1993 | Kramer | 364/806 |
| 5,185,561 A | 2/1993 | Good et al. | 318/432 |
| 5,186,629 A | 2/1993 | Rohen | 434/114 |
| 5,186,695 A | 2/1993 | Mangseth et al. | |
| 5,189,355 A | 2/1993 | Larkins et al. | 318/685 |
| 5,193,963 A | 3/1993 | McAffee et al. | 414/5 |
| 5,212,473 A | 5/1993 | Louis | |
| 5,223,776 A | 6/1993 | Radke et al. | 318/568.1 |
| 5,228,356 A | 7/1993 | Chuang | 74/471 XY |
| 5,240,417 A | 8/1993 | Smithson et al. | |
| 5,264,768 A | 11/1993 | Gregory et al. | 318/561 |
| 5,271,290 A | 12/1993 | Fischer | |
| 5,275,174 A | 1/1994 | Cook | |
| 5,286,203 A | 2/1994 | Fuller et al. | 434/45 |
| 5,296,846 A | 3/1994 | Ledley | 345/161 |
| 5,296,871 A | 3/1994 | Paley | 345/163 |
| 5,299,810 A | 4/1994 | Pierce | |
| 5,309,140 A | 5/1994 | Everett | |
| 5,334,027 A | 8/1994 | Wherlock | |
| 5,351,412 A | 10/1994 | Furuhata et al. | 33/568 |
| 5,354,162 A | 10/1994 | Burdea et al. | 414/5 |
| 5,381,080 A | 1/1995 | Schnell et al. | 318/566 |
| 5,396,266 A | 3/1995 | Brimhall | 345/161 |
| 5,405,152 A | 4/1995 | Katanics et al. | 273/438 |
| 5,414,337 A | 5/1995 | Schuler | 318/561 |
| 5,429,140 A | 7/1995 | Burdea et al. | 128/774 |
| 5,436,622 A | 7/1995 | Gutman et al. | |
| 5,436,640 A | 7/1995 | Reeves | 345/161 |
| 5,452,615 A | 9/1995 | Hilton | 73/862.043 |
| 5,466,213 A | 11/1995 | Hogan | |
| 5,473,235 A | 12/1995 | Lance et al. | 318/561 |
| 5,489,812 A * | 2/1996 | Furuhata et al. | 310/309 |
| 5,512,919 A | 4/1996 | Araki | 345/156 |
| 5,513,100 A | 4/1996 | Parker et al. | 364/167 |
| 5,547,382 A | 8/1996 | Yamasaki | |
| 5,576,727 A | 11/1996 | Rosenberg et al. | 345/179 |
| 5,577,981 A | 11/1996 | Jarvik | 482/4 |
| 5,587,937 A | 12/1996 | Massie et al. | 364/578 |
| 5,589,828 A | 12/1996 | Armstrong | 341/20 |
| 5,589,854 A | 12/1996 | Tsai | 345/161 |
| 5,591,082 A | 1/1997 | Jensen et al. | 463/38 |
| 5,591,924 A | 1/1997 | Hilton | 73/862.043 |
| 5,623,582 A | 4/1997 | Rosenberg | 395/99 |
| 5,629,594 A | 5/1997 | Jacobus et al. | 318/568 |
| 5,634,794 A | 6/1997 | Hildreth et al. | 434/37 |
| 5,642,469 A | 6/1997 | Hannaford et al. | 395/99 |
| 5,643,087 A | 7/1997 | Marcus et al. | 463/38 |
| 5,666,138 A | 9/1997 | Culver | 345/161 |
| 5,666,473 A | 9/1997 | Wallace | 345/420 |
| 5,687,080 A | 11/1997 | Hoyt et al. | 364/190 |
| 5,691,898 A | 11/1997 | Rosenberg et al. | 364/190 |
| 5,709,219 A | 1/1998 | Chen et al. | 128/782 |
| 5,714,978 A | 2/1998 | Yamanaka et al. | 345/157 |
| 5,721,566 A | 2/1998 | Rosenberg et al. | 345/161 |
| 5,731,804 A | 3/1998 | Rosenberg | 345/156 |
| 5,734,373 A | 3/1998 | Rosenberg et al. | 345/161 |
| 5,739,811 A | 4/1998 | Rosenberg et al. | 345/161 |
| 5,742,278 A | 4/1998 | Chen et al. | 345/156 |
| 5,755,577 A | 5/1998 | Gillio | 434/262 |
| 5,766,016 A | 6/1998 | Sinclair | |
| 5,767,839 A | 6/1998 | Rosenberg | 345/161 |
| 5,769,640 A | 7/1998 | Jacobus et al. | 434/262 |
| 5,781,172 A | 7/1998 | Engel et al. | 345/164 |
| 5,784,052 A | 7/1998 | Keyson | 345/167 |
| 5,785,630 A | 7/1998 | Bobick et al. | |
| 5,790,108 A | 8/1998 | Salcudean et al. | 345/184 |
| 5,805,140 A | 9/1998 | Rosenberg et al. | 345/161 |
| 5,816,105 A | 10/1998 | Adelstein | 74/471 XY |
| 5,821,920 A | 10/1998 | Rosenberg et al. | 345/156 |
| 5,823,876 A | 10/1998 | Unbehand | 463/37 |
| 5,825,308 A | 10/1998 | Rosenberg | 341/20 |
| 5,828,363 A | 10/1998 | Yaniger et al. | 345/156 |
| 5,831,596 A | 11/1998 | Marshall et al. | 345/161 |
| 5,847,528 A * | 12/1998 | Hui et al. | 318/568.1 |
| 5,889,670 A | 3/1999 | Schuler et al. | 364/186 |
| 5,898,599 A * | 4/1999 | Massie et al. | 345/161 |
| 5,903,085 A | 5/1999 | Karam | 310/328 |
| 5,944,151 A | 8/1999 | Jakobs et al. | 188/267.1 |
| 5,979,892 A | 11/1999 | Smith | 271/267 |
| 5,990,869 A | 11/1999 | Kubica et al. | 345/163 |
| 6,001,014 A | 12/1999 | Ogata et al. | 463/37 |

| | | |
|---|---|---|
| 6,004,134 A | 12/1999 | Marcus et al. ............... 434/45 |
| 6,028,593 A | 2/2000 | Rosenberg et al. ......... 345/156 |
| 6,037,927 A | 3/2000 | Rosenberg ................... 345/156 |
| 6,044,646 A | 4/2000 | Silverbrook ................. 60/528 |
| 6,046,727 A | 4/2000 | Rosenberg et al. ......... 345/156 |
| 6,067,077 A | 5/2000 | Martin et al. ............... 345/161 |
| 6,078,126 A * | 6/2000 | Rollins et al. .............. 310/330 |
| 6,104,382 A | 8/2000 | Martin et al. ............... 345/161 |
| 6,275,213 B1 | 8/2001 | Tremblay et al. ........... 345/156 |
| 6,422,941 B1 | 7/2002 | Thorner et al. |

FOREIGN PATENT DOCUMENTS

| | | |
|---|---|---|
| EP | 0349086 | 1/1990 |
| EP | 0 349 086 A1 | 1/1990 |
| GB | 2254911 A | 10/1992 |
| JP | 4-34610 | 2/1992 |
| WO | WO9520787 | 8/1995 |
| WO | WO9520788 | 8/1995 |
| WO | WO9532459 | 11/1995 |
| WO | WO 96/16397 | 5/1996 |
| WO | WO 96/39944 | 12/1996 |
| WO | WO99/40504 * | 8/1999 |
| WO | WO01/11775 A1 | 2/2001 |

OTHER PUBLICATIONS

Howe, R. et al., "Task Performance with a Dextrous Teleoperated Hand System," Proceedings of SPIE, vol. 1833, Nov. 1992.

Buttolo, et al., "Hard Disk Actuators for Mini Teleoperation," Proc. SPIE, Telemanipulator and Telepresence Technologies Symp., Oct. 1994, pp. 1–8.

Kilpatrick, P., "The Use of a Kinesthetic Supplement in an Interactive Graphics System," Univ. of N. Carolina, 1976, pp. 1–175.

Buttolo et al., "Pen Based Force Display for Precision Manipulation in Virtual Environments", IEEE Mar. 1995, pp. 217–224.

Ellis, R.E. et al., "Design and Evaluation of a High–Performance Prototype Planar Haptic Interface," ASME Dec. 3, 1993, DSC–vol. 49, pp. 55–64.

Adelstein Bernard D. et al., "A High Performance Two Degree–of–Freedom Kinesthetic Interface," Massachusetts Institute of Technology 1992, pp. 108–112.

Colgate, J. et al., "Implementation of Stiff Virtual Walls in Force–Reflecting Interfaces," Sep. 22, 1993.

Rosenberg, Louis B., The Use of Virtual Fixtures to Enhance Operator Performance in Time Delayed Teleoperation, Armstrong Laboratory, Mar. 1993, pp. 1–45.

Rosenberg, Louis B., "Perceptual Design of a Virtual Rigid Surface Contact," Center for Design Research Stanford University, Air Force Material Command, Apr. 1993, pp. 1–41.

Adelstein, Bernard D. et al., "Design and Implementation of a Force Reflecting Manipulandum for Manual Control Research," Dept. of Mech. Eng., MIT, 1992, pp. 1–24.

Hannaford, B. et al., "Performance Evaluation of a Six–Axis Generalized Force–Reflecting Teleoperator," IEEE Transactions on Systems, Man, and Cybernetics, 1991.

Minsky, et al., "Felling and Seeing: Issues in Force Display", Department of Computer Science, University of North Carolina at Chapel Hill, NC 27599, 1990 ACM.

Batter, et al., "Grope–1: A Computer Display to the Sense of Feel", University of North Carolina at Chapel Hill, Chapel Hill, North Carolina, USA.

Gotow, J.K., et al., "Perception of Mechanical Properties at the Man–Machine Interface," IEEE 1987, pp. 688–689.

Atkinston, William D. et al, "Computing with Feeling," Comput. & Graphics, vol. 2, 1977, pp. 97–103.

Tavkhelidze, et al., "Kinematic Analysis of Five–Link Spherical Mechanisms," Mechanism and Machine Theory, vol., 9, 1974, pp. 181–190.

Schmult, Brian et al., "Application Areas for a Force–Feedback Joystick," ASME 1993, DSC–vol. 49, pp. 47–54.

Russo, "The Design and Implementation of a Three Degree–of–Frreedom Force Output Joystick", Submitted to the Department of Mechanical Engineering on May 11, 1990.

Kelley, A.J. et al., "MagicMouse: Tactile and Kinesthetic Feedback in the Human–Computer Interface using an Electromagnetically Actuated Input/Output Device," Dept. of Elec. Engineering, Univ. of British Columbia, 1993, pp. 1–27.

Brooks, F. et al., "Project GROPE—Haptic Displays for Scientific Visualization," Computer Graphics, vol. 24, No. 4, 1990, pp. 177–185.

Millman, P. et al., "Design of a Four Degree–of–Freedom Force–Reflecting Manipulandum with a Specified Force/Torque Workspace," IEEE CH2969–4, 1991, pp. 1488–1492.

Iwata, H., "Artificial Reality with Force–feedback: Development of Desktop Virtual Space with Compact Master Manipulator," Computer Graphics, vol. 24, No. 4, 1990, pp. 165–170.

Hirota, Koichi et al., "Development of Surface Display," IEEE 0–7803–1363–1, 1993, pp. 256–262.

Hayward, et al., "Design and Multi–Objective Optimization of a Linkage for a Haptic Interface," excerpt from *Advances in Robot Kinematics and Computationed Geometry*, 1994 Kluwer Academic Publishers, pp. 359–368.

Slocum, Alexander H., Precision Machine Design, Prentice Hall, 1992, pp. 661–664.

"12–V Voice Coil Motor Driver," Si9961 Jun. 6, 1994, pp. 4–10–4–16.

Burdea, G., et al, "Distributed Virtual Force Feedback", IEEE Workshop on Force Display in Virtual Environments and its Application t Robotic Teleoperation, May 1993, pp. 25–44.

Burdea, Grigore et al., "Dextrous Telerobotics with Force Feedback–An Overview," Robotica 1991, vol. 9.

Bostrom, M. et al., "Design of An Interactive Lumbar Puncture Simulator with Tactile Feedback," IEEE 0–7803–1363–1, 1993, pp. 280–286.

Ramstein, et al., "The Pantograph: A Large Workspace Haptic Device for a Multimodal Human–Computer Interaction," Computer–Human Interaction, CHI 1994.

Ramstein, C., "Combining Haptic and Braille Technologies: Design Issues and Pilot Study," Assets '96, $2^{nd}$ Annual ACM Conf. on Assistive Technologies, 1996, pp. 37–44.

Payette, J. et al., "Evaluation of a Force Feedback (Haptic) Computer Pointing Device in Zero Gravity", Proceedings of the ASME Dynamics Systems and Control Division, ASME Oct. 17, 1996, pp. 547–553.

Adelstein et al., Human Machine Interfaces for Teleoperators and Virtual Environments, NASA Conference Publication 10071, N95–14042, pp. 108–113, (Mar. 4 –9, 1990).

Adelstein, "Design and Implementation of a Force Reflecting Manipulation for Manual Control research," DSC–vol. 42, Advances in Robotics, Edited by H. Kazerooni, pp. 1–12, (1992).

Baigrie, "Electric Control Loading –A Low Cost, High Performance Alternative," Proceedings, pp. 247–254, (Nov. 6–8, 1990).

Bejczy et al., "Controlling Remote Manipulators Through Kinesthetic Coupling," Computers in Mechanical Engineering NT Control No. MPO–17851; JPL Case No. 5348 Attachment, pp. 48–61, (Jul. 1983).

Brooks et al., "Hand Controllers for Teleoperation –A State–of–the–Art Technology Survey and Evaluation," JPL Publication 85–11; NASA–CR–175890; N85–28559, pp. 1–84, (Mar. 1, 1985).

Burdea et al., "Dextrous Telerobotics with Force Feedback –An Overview. Part 2: Human Factors," Robotics (1991) vol. 9, pp. 291–298, (Jun. 22, 1990).

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, (May 2, 1993).

Caldwell et al., "Enhanced Tactile Feedback (Tele–Taction) Using a Multi–Functional Sensory System," 1050–4729/93, pp. 955–960, (1993).

Fukumoto et al., "Active Click: Tactile Feedback for Touch Panels," NTT DoCoMo, ACM CHI 2001 Extended Abstracts, pp. 121–122 (Apr. 2001).

Gotow et al., "Controlled Impedance Test Apparatus for Studying Human Interpretation of Kinesthetic Feedback," WA11–11:00, pp. 332–337.

Iwata et al., "Volume Haptization," 0–8166–4910–0/93 IEEE, pp. 16–23, (1993).

Iwata, "Pen–based Haptic Virtual Environment," 0–7803–1363–1/93 IEEE, pp. 287–292, (1993).

Jones et al., "A Perceptual Analysis of Stiffness," ISSN 0014–4819 Springer International (Springer–Verlag); Experimental Brain Research, vol. 79, No. 1, pp. 150–156, (1990).

Kontarinis et al., "Display of High–frequency Tactile information to Teleoperators" Telemanipulator Technology and Space Telerobotics, Won S. Kim, Editor, Proc. SPIE vol. 2057, pp. 40–50, Sep. 7–9, (1993).

Ouh–Young, "Force Display in Molecular Docking," Order No. 9034744, pp. 1–369, (1990).

Patrick et al., "Design and Testing of A Non–reactive, Fingertip, Tactile Display for Interaction with Remote Environments" Cooperative Intelligent Robotics in Space, Rui J. deFigueiredo et al., Editor, Proc. SPIE vol. 1387, pp. 215–222, (1990).

Russo, "Controlling Dissipative Magnetic Particle Brakes in Force Reflective Devices," DSC–vol. 42, Advances in Robotics, pp. 63–70, (1992).

Russo, "The Design and Implementation of a Three Degree of Freedom Force Output Joystick," MIT Libraries Archives Aug. 14, 1990, pp. 1–131, (May 1990).

Snow et al., "Compact Force–Reflecting Hand Controller," NASA TechBriefs, Apr., 1991, vol. 5, No. 4, p. 88, (Apr. 1991).

Snow et al., "Model–X Force–Reflecting–Hand–Controller," NT Control No. MPO–17851; JPL Case No. 5348, pp. 1–4, (Jun. 15, 1989).

Stanley et al., "Computer Simulation of Interacting Dynamic Mechanical Systems Using Distributed Memory Parallel Processors," DSC–vol. 42, Advances in Robotics, pp. 55–61, (1992).

Tadros, Control System Design for a Three Degree of Freedom Virtual Environment Simulator Using Motor/Brake Pair Actuators, MIT Archive © Massachusetts Institute of Technology, pp. 1–88, (Feb. 1990).

Tan et al., "Manual Resolution of Compliance When Work and Force Cues are Minimized," DSC –vol. 49, Advances in Robotics, Mechatronics and Haptic Interfaces ASME 1993, The American Society og Mechanical Engineers, pp. 99–104, (Nov. 28–Dec. 3, 1993).

Townsend "Model–X Force–reflecting Hand Controller," NT Control No. MPO–17851; JPL Case No. 5348 Attachment, pp. 1–17, (Aug. 20, 1987).

Wright, "A Manufacturing Hand," ISSN 0736–5845/85 (704), pp. 13–23, (1985).

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30 –Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback In A Computer Mouse," Proceedings of Fouteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "Omar –A Haptic display for speech perception by deaf and deaf–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contactor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch–Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

* cited by examiner

12
FLEXURE MECHANISM FOR INTERFACE DEVICE

CROSS REFERENCE TO RELATED APPLICATIONS

This application is a continuation-in-part of parent patent application Ser. No. 09/140,717, now U.S. Pat. No. 6,201,533, filed Aug. 26, 1998 on behalf of Rosenberg et al., which is a divisional of patent application Ser. No. 08/560,091, filed Nov. 17, 1995, now U.S. Pat. No. 5,805,140, assigned to the assignee of this present application, and which is incorporated herein by reference in its entirety.

BACKGROUND OF THE INVENTION

The present invention relates generally to the interfacing with computer devices by a user, and more particularly to devices used to provide input to computer systems and which provide force feedback to the user.

Humans interface with electronic devices in a variety of applications, and there is a constant need for a more natural, easy-to-use, and versatile interface device. One of those applications includes interacting directly with computer-generated environments. Interface devices are used extensively with computer systems in the implementation of computer-controlled games, simulations, and other applications very popular with the mass market of home consumers. In a typical implementation, a computer system such as a personal computer, home video game console, portable computer, etc., displays a graphical environment to a user on a display device. Users can interact with the displayed environment by inputting commands or data from the interface device. Popular interface devices include joysticks, "joypad" or "gamepad" button controllers, mice, trackballs, styluses, tablets, steering wheels, pressure spheres, foot or hand pedals, or the like, that are connected to the computer system controlling the displayed environment. The computer updates the environment in response to input signals from the interface device based on the user's manipulation of a moved manipulandum such as a joystick handle, joypad, or mouse. The computer provides visual feedback to the user using the display screen.

In some interface devices, haptic (e.g., tactile and/or kinesthetic) feedback is also provided to the user, more generally known as "force feedback" herein. These types of interface devices can provide physical sensations to the user manipulating the physical object of the interface device. Typically, motors or other actuators of the interface device are coupled to the manipulandum and are connected to the controlling computer system. The computer system receives sensor signals from the interface device and sends appropriate force feedback control signals to the actuators in conjunction with host events. The actuators then provide forces on the manipulandum. The computer system can thus convey physical sensations to the user in conjunction with other visual and auditory feedback as the user is contacting the manipulandum. Commercially available force feedback devices include the ForceFX joystick from CH Products, Inc., the Wingman Force joystick and Wingman Formula Force steering wheel from Logitech, Inc., and the Sidewinder Force Feedback Pro joystick from Microsoft Corporation.

One problem occurring in commercially-available implementations of force feedback devices is that the devices are very bulky. A large base or support is typically required to house a large mechanism and/or large actuators. These features make it difficult to integrate compelling force feedback into a smaller interface device such as a handheld gamepad or joystick. The mechanisms provided in both regular and force feedback interface devices are typically expensive, complex mechanisms which in turn cause the cost of the interface devices to be expensive. Handheld interface devices are desired to be low cost items, making it difficult to incorporate accurate position sensing and/or force feedback functionality into these devices. Yet, these controllers are preferred by manufacturers as low-cost input devices for many types of systems, especially home video game consoles, and are also preferred by many consumers.

SUMMARY OF THE INVENTION

The present invention provides a flexure mechanism for an interface device that interfaces a user with a computer system. The flexure mechanism provides a low cost, easily manufactured mechanism that is stable and accurate.

More particularly, in one aspect of the present invention, an interface device is manipulated by a user and provides input signals to a host computer. The device includes a manipulandum physically contacted by the user and moveable in at least two rotary degrees of freedom. A five-bar closed-loop mechanism is coupled to the manipulandum to provide the two rotary degrees of freedom. The mechanism includes four members forming a unitary piece coupled to a ground, where the members are coupled to each other by flexible couplings allowing rotation of the members. A sensor, such as a rotary optical encoder or analog potentiometer, is coupled to the mechanism and senses a position of the manipulandum in at least one of the degrees of freedom and outputs a sensor signal, where a representation of the sensor signal is provided to the host computer. Preferably, each of the flexible couplings bends about only one rotational axis and may not twist.

The mechanism preferably includes two extension members and two central members flexibly coupled each other, where the manipulandum is coupled to one of the central members. In one embodiment, at least one actuator is coupled to the mechanism to output a force to the manipulandum in one or more of the degrees of freedom. In the preferred embodiments, the manipulandum is a joystick handle or at least a portion of a sphere, the device is in the form of a handheld gamepad or similar controller, and the computer is a home video console system or personal computer.

Preferably, the two degrees of freedom are provided about two base axes of rotation and the central members rotate about two floating axes of rotation, where flexible couplings between the extension members and the central members are substantially aligned with the floating axes of rotation. The central members can extend out of a plane formed by the axes of rotation. The flexible coupling between the central members can be substantially aligned with a normal axis extending approximately perpendicularly from a plane formed by the base axes when the central members are in an origin position.

The flexible couplings are preferably relatively thin in the dimension allowing flex and relatively thick in the dimensions in which the coupled members are to be rigid with respect to each other, where the flexible couplings allow bending and no twisting. At least two of the flexible couplings can be oriented such that when force is applied to the central members by the user contacting the manipulandum, a pulling tension is applied to the flexible couplings and their stability under the load is maintained.

In one preferred embodiment, the unitary piece of members includes a ground member coupled to the ground, where the first and second extension members are coupled to the ground member by flexible couplings. This embodiment provides flexible couplings for all the joints of the mechanism. These flexible couplings between the ground member and extension members are preferably substantially aligned with the base axes of rotation. The grounded member includes first and second sides arranged substantially perpendicular to each other in a single plane, and a first end of each extension member is coupled to the ground member at each side by the flexible couplings.

In a similar embodiment, an interface device manipulated by a user and providing input signals to a host computer includes a manipulandum and a mechanism coupled to the manipulandum that provides at least two rotary degrees of freedom about two axes of rotation. The mechanism is a closed loop five-bar linkage including five members, one of the five members being a ground, where at least two flexure couplings are provided to couple at least some of the five members to each other to allow the flexibly coupled members to bend with respect to each other. At least one sensor and actuators are provided to sense motion of and output forces to the manipulandum. The flexure couplings are preferably provided between a first extension member and a first central member and between a second extension member and a second central member; additional flexure couplings can be provided between first and second central members and between ground and the extension members. The flexure couplings are preferably aligned with and bend about only the axes of rotation and do not allow twist.

The present invention provides a compact, accurate, and stable mechanism for use in interface devices. The flexure mechanism is easily manufactured and requires minimal assembly, thereby greatly reducing the cost in producing both standard non-force-feedback interface devices as well as force feedback interface devices. The stiffness and accuracy of the mechanism allows precise sensing of motion as well as realistic and compelling conveyance of force sensations to a user of the device. The low cost and compactness of the mechanism allows easy integration into handheld interface devices.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
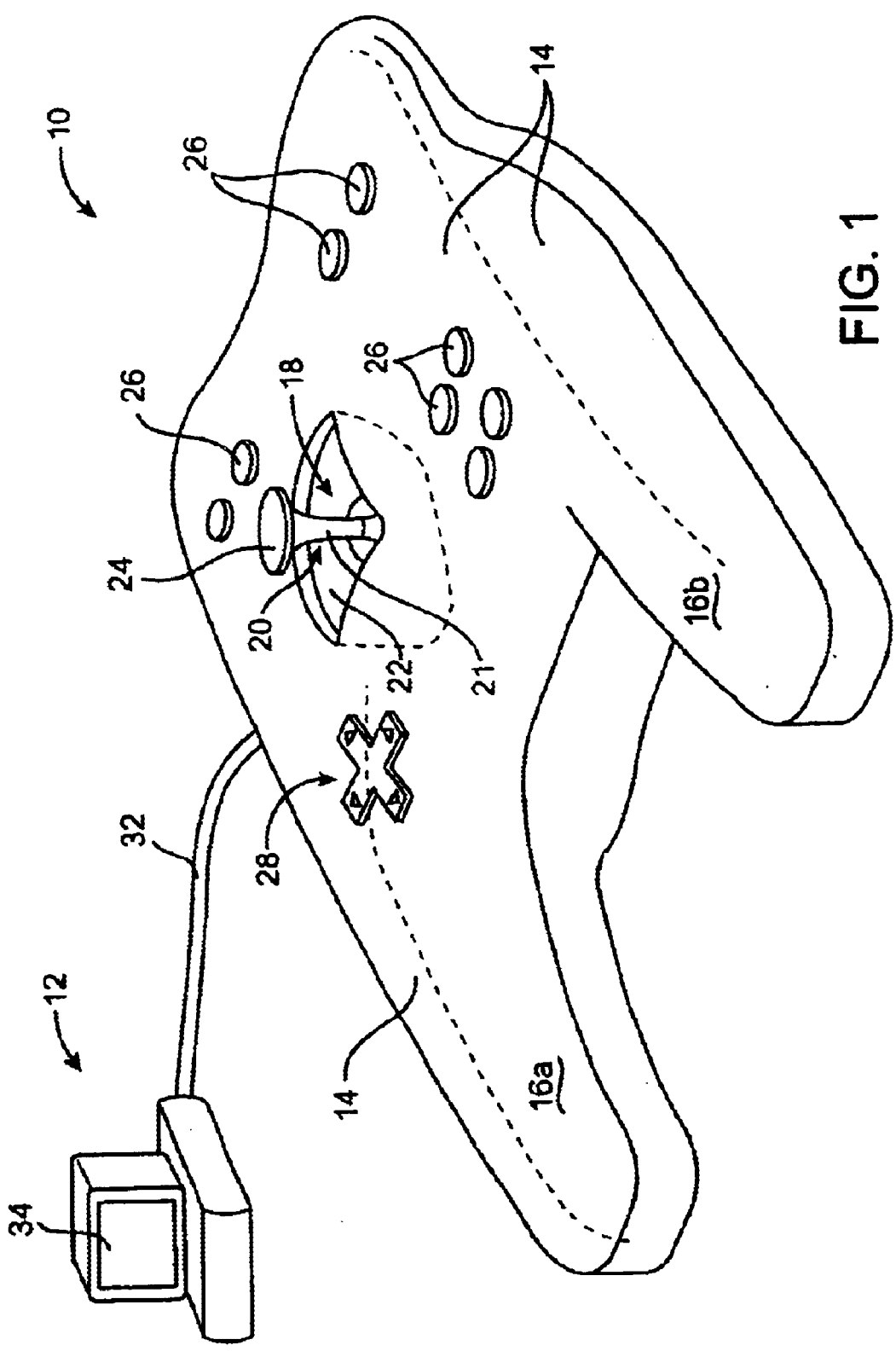
FIG. 1 is a perspective view of one embodiment of an interface device suitable for use with the present invention.

FIG. 1 is a perspective view of one example of a force feedback interface device 10 including the flexure mechanism of the present invention. The device is used for interfacing a user with a computer generated environment implemented by a host computer 12.

Interface device 10 of the described embodiment is in the form of a handheld controller, of similar shape and size to many "gamepads" currently available for video game console systems. A housing 14 of the interface device 10 is shaped to easily accommodate two hands gripping the device at the gripping projections 16a and 16b. In the described embodiment, the user accesses the various controls on the device 10 with his or her fingers. In alternate embodiments, the interface device can take a wide variety of forms, including devices that rest on a tabletop or other surface, stand-up arcade game machines, laptop devices or other devices worn on the person, etc.

A user manipulatable object 18 (or "manipulandum") such as a finger joystick 20 is included in device 10 that projects out of the top surface of the housing 14 to be manipulated by the user in one or more degrees of freedom. In the preferred embodiment, the user can grasp each of grips 16a and 16b of the device and use a thumb or finger to manipulate the joystick 20 in two degrees of freedom (or three or more degrees of freedom in some embodiments). Finger joystick 20 preferably includes a rod 21 that extends out of an aperture 22 in the housing 14 and which includes a finger engagement surface 24 which the user contacts to manipulate the joystick. Surface 24 can be textured or provided with a frictional material to allow the user's finger to achieve a firm grip on the joystick. In other embodiments, differently-shaped surfaces can be used in place of surface 24, such as receptacles, cradles, etc.

Joystick 20 can preferably be moved in two rotary degrees of freedom (e.g., forward/back and left/right, or combinations thereof). This motion is translated into input signals provided to the host computer 12, and the host 12 updates a displayed graphical environment or application program based on the input. In some embodiments, a third linear degree of freedom can be provided where the joystick 20 (or a portion thereof) can be moved up and down along an axis extending through the length of the rod 21. In some embodiments, an additional rotary or "spin" degree of freedom can be provided to allow the joystick 20 to spin about the axis extending through the length of the rod 21. These additional degrees of freedom can provide additional inputs to the host 12 to allow control over other aspects of the application program by the user.

In still other embodiments, a sphere can be provided as the user manipulandum 20, where one or more portions of the sphere can extend out of left, right, top and/or bottom sides of the housing 14, e.g., allowing at least two fingers of the user to grip the sphere. The sphere may be rotated in place within two rotary degrees of freedom and operate similarly to a joystick; a portion of a sphere is shown in the embodiment of FIG. 5c, described below. Another embodiment of a sphere is described in detail in copending provisional application Ser. No. 60/133,208, incorporated herein by reference.

One or more buttons 26 are also preferably provided on the surface of the housing 14 of the device 10. The user's hands have easy access to the buttons, each of which may be pressed by the user to provide a distinct input signal to the host computer 12. A directional button pad or "joypad" 28 can be provided to allow additional input from the user, where a single piece may be pressed in one or more places to provided input in four or eight directions. Instead of or in addition to buttons 26 and direction pad 28, other controls may be placed within easy reach of the hands grasping the housing 14. For example, one or more trigger buttons can be positioned on the underside of the housing and can be pressed by the fingers. of the user. Other controls can also be provided on various locations of the device 10, such as a dial or slider for throttle control in a game, a four- or eight-way hat switch, knobs, trackballs, etc. Any of these controls can also be provided with force feedback, such as tactile feedback and/or kinesthetic feedback; for example, embodiments of buttons, direction pads, and knobs having force feedback are described in U.S. Pat. Nos. 6,184,868 and 6,154,201, all incorporated herein by reference. The forces can be colocated such that the user feels the forces in the degree of freedom of movement of the button or joypad; or, the button, joypad, and/or the housing of the device can be provided with tactile sensations such as vibrations. For example, a directional pad can be provided with force feedback on one or more of the directions of the pad, or on a motion of the entire pad as it is pressed downward (e.g. from the center of the pad). Using one or more actuators and sensors coupled to the buttons or other controls, a variety of force sensations can be output to the user who is contacting the button. For example, jolts, vibrations, textures, spring forces, damping forces, and obstruction forces can be output. Forces can be at least in part based on the position of the button in its degree of freedom, and/or independent of button position. Furthermore, a moveable portion can be provided on the housing 14 which is contacted by the user when the user operates the device and which can provide tactile feedback as described in U.S. Pat. No. 6,184,868. The linear voice coil actuators described in Pat. No. 6,184,868 may also be used to actuate controls in the present invention.

In yet other embodiments, a similar force feedback interface device can be implemented in other applications, such as a hand-held remote control device used to access the functions of a device or appliance remotely by a user (such as a television, video cassette recorder or DVD player, sound stereo, Internet or network computer connected to a television, etc.).

Interface device 10 is coupled to host computer 12 by a bus 32, which can be any of several types of communication media. For example, a serial interface bus, parallel interface bus, or wireless communication link can be used. Specific implementations can include Universal Serial Bus (USB), IEEE 1394 (Firewire), RS-232, or other standards.

Host computer 12 is preferably a personal computer, workstation, video game console, or other computing or electronic device. Personal computers, such as an IBM-compatible or Macintosh personal computer, or a workstation, such as a SUN or Silicon Graphics workstation, can be used. Alternatively, one of a variety of home video game systems, such as systems available from Nintendo, Sega, or Sony, a television "set top box" or a "network computer", etc. can be used. Or, the host 12 and device 10 can be included in a single housing in an arcade game machine, portable computer, or other device. Host computer system 12 preferably implements a host application program with which a user is interacting via peripherals and interface device 10. For example, the host application program can be a video or computer game, medical simulation, scientific analysis program, operating system, graphical user interface, or other application program.

The host application preferably displays graphical images of the environment on a display device included with the host computer, such as a display screen 34, a television, 3D display goggles, LCD display, etc. The software and environment running on the host computer 12 may be of a wide variety. For example, the host application program can be a video game, simulation, graphical user interface (GUI), Web page or browser that implements HTML or VRML instructions, scientific analysis program, virtual reality training program or application, or other application program that utilizes input from the interface device 10 and (in force feedback embodiments) outputs force feedback commands to the controller 10. For example, many game application programs include force feedback functionality and may communicate with the force feedback interface device 10 using a standard protocol/drivers such as I-Force® or FEELit® available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated cockpit of an aircraft might be considered a graphical object.

In operation, the controls of interface device 10 are manipulated by the user, which indicates to the computer how to update the implemented application program(s). An electronic interface included in housing 14 of device 10 can couple the device 10 to the computer 12. The host computer 12 receives the input from the interface device and updates an application program in response to the input. For example, a game presents a graphical environment in which the user controls one or more graphical objects or entities using the joystick 20 and other controls such as buttons 26 and 28. In force feedback embodiments, the host computer provides force feedback commands and data to the device 10 to cause force feedback to be output on joystick 20 and/or other controls.

Figure 2A:
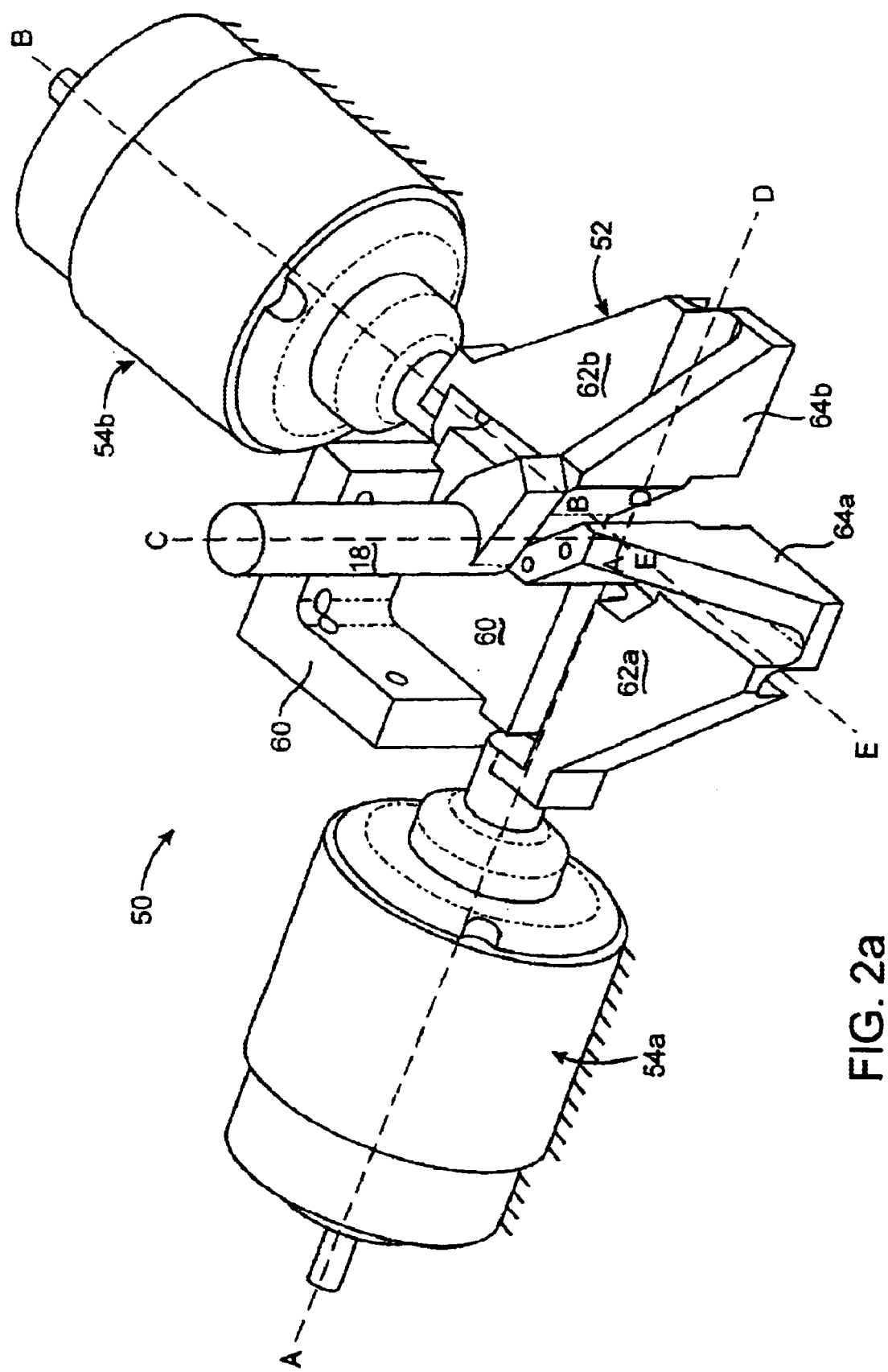
FIG. 2a is a perspective view of a mechanical system for use with the interface device of FIG. 1 and including a mechanism of the present invention.

FIG. 2a is a perspective view of a mechanical system 50 of the present invention suitable for use with the interface device 10 of FIG. 1 or other types of interface devices. Mechanical system 50 includes a flexure gimbal mechanism 52 and transducers 54a and 54b. A manipulandum 18, such as joystick 20 or other object, is coupled to the gimbal mechanism 52.

Gimbal mechanism 52 of the present invention is a five-bar linkage which includes a plurality of members connected to each other in a closed loop through flexure couplings instead of rotating or sliding bearings. Gimbal mechanism 52 provides two degrees of freedom to manipulandum 56, where the members of the gimbal mechanism are flexibly coupled to one another to allow a rotational motion with respect to each other. The gimbal mechanism 52 is described in greater detail with reference to FIG. 3.

Transducers 54a and 54b are electronically controlled to sense motion of the manipulandum 18 in the two degrees of freedom, and to output forces in those degrees of freedom. Transducer 54a senses motion and outputs forces in one degree of freedom, and transducer 54b senses motion and outputs forces in the other degree of freedom. Both transducers 54 are grounded, e.g. coupled to housing 14 or other ground member, which allows greater fidelity and accuracy in producing force sensations. In one embodiment, transducers 54a and 54b include both an actuator, such as a D.C. motor, and a sensor, such as an optical encoder. In other embodiments, transducers 54a and 54b can be only actuators, while sensors are provided separately. For example, a sensor for each degree of freedom can be positioned at a different point on axis A and axis B to measure the rotation of the gimbal mechanism. In still other embodiments, a mechanical transmission can be provided between sensors and the gimbal mechanism 52 and/or between actuators and the gimbal mechanism 52. The transducers 54 are described in greater detail with respect to FIG. 3.

Figure 2B:
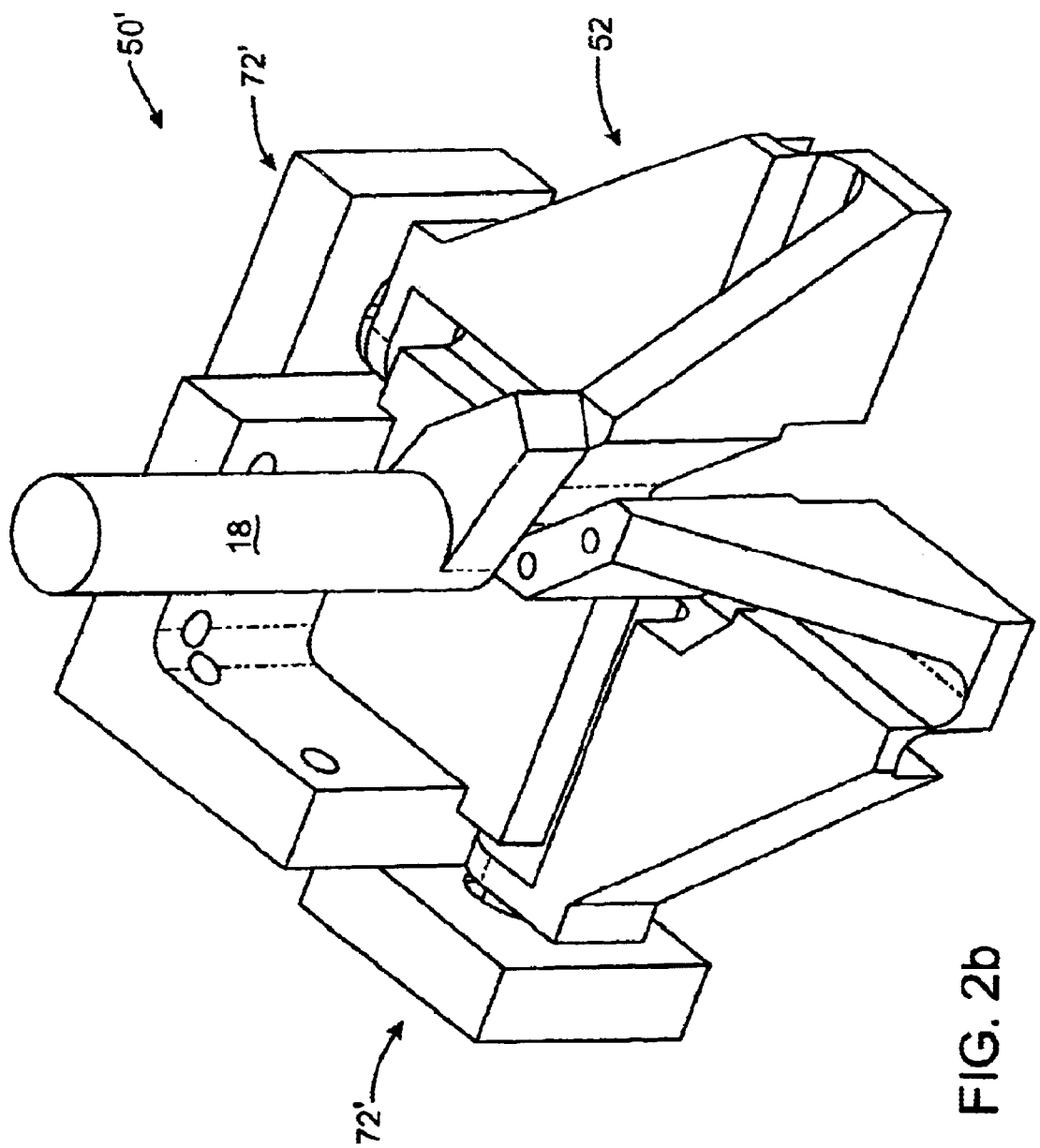
FIG. 2b is a perspective view of an alternative mechanical system to that of FIG. 2a and including the present invention.

FIG. 2b is a perspective view showing an alternate embodiment 50' of the mechanical system 50 shown in FIG. 2a. In mechanical system 50', the mechanism 52 and manipulandum are the same as explained above. Instead of transducers 54 including actuators 70 and sensors 72, system 50' includes only sensors 72', which can be analog potentiometers or optical encoders, for example. Thus, the mechanism 52 of the present invention can also be used in interface devices not including force feedback functionality, such as standard joysticks, steering controllers, or other input devices. The low cost of manufacture and ease of assembly make the gimbal mechanism 52 ideal for several applications.

Figure 3:
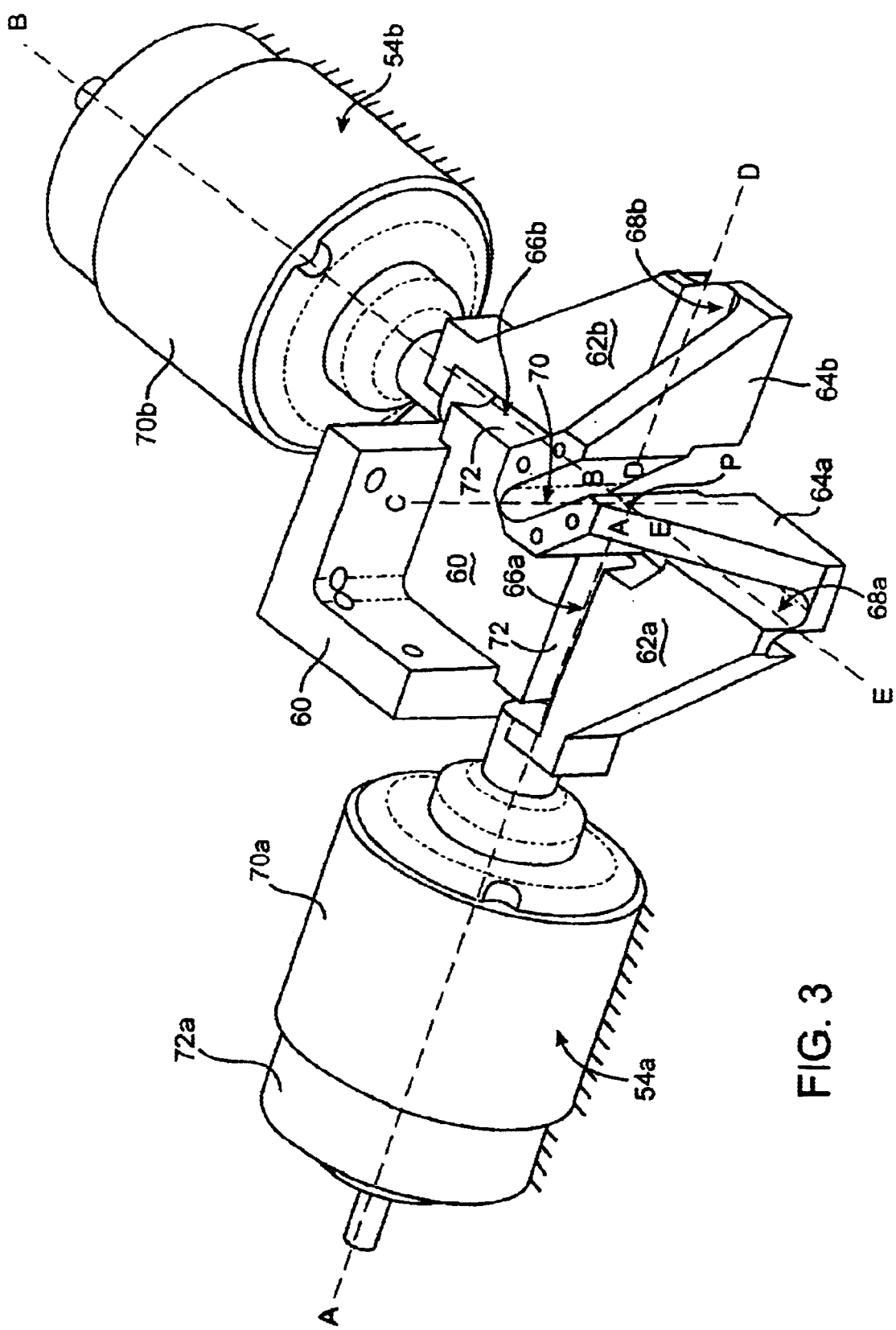
FIG. 3 is a perspective view of a flexure gimbal mechanism of the present invention.

FIG. 3 is a perspective view of the gimbal mechanism 52 and transducers 54 of the mechanical system of FIG. 2. Gimbal mechanism 52 is a five-bar linkage having five members rotatably coupled in a closed loop chain. However, five flexible couplings (or flexible joints) instead of bearings are used to couple the members, so that the entire gimbal mechanism 52 is a single, unitary member. Thus the "members" disclosed herein are actually segments of a single flexure that are connected by flexible bearings or hinges.

Gimbal mechanism 52 includes a ground member 60 that is provided as support and is rigidly coupled to a grounded surface (relative to the gimbal mechanism) such as the housing 14 of the device 10. Two extension members 62a and 62b are rotatably coupled to the ground member by flexure couplings 66a and 66b, respectively. A central member 64a is rotatably coupled to extension member 62a by a flexure coupling 68a, and a central member 64b is rotatably coupled to extension member 62b by a flexure coupling 68b. Central members 64a and 64b are rotatably coupled to each other at a flexure coupling 70, where the manipulandum 56 is preferably coupled to one of the central members 64 (member 64b in FIG. 2).

In the preferred embodiment, when the central members 64 are positioned in a neutral, origin position as shown in FIG. 3, the extension members 62 are oriented substantially in a plane defined by the axes A and B. Central members 64 preferably extend approximately perpendicularly out of that plane, and the flexure coupling 70 also is preferably oriented approximately perpendicular to the plane formed by axes A and B when the central members are at the origin position.

The gimbal mechanism operates such that extension member 62a can rotate about a "base" axis A, central member 64b can rotate about a floating axis D, extension member 62b can rotate about base axis B, and central member 64a can rotate about floating axis E. The axes D and E are "floating" in the sense that these axes are not fixed in one position relative to ground as are axes A and B, e.g., the orientation of axis D changes if there is rotation about axes B and E, and the orientation of axis E changes if there is rotation about axes A and D. Axes A and B are substantially mutually perpendicular. The five-bar linkage is arranged such that extension member 62a and central member 64a can be rotated about axis A in a first degree of freedom, which causes central member 64b to rotate about axis D. Furthermore, extension member 62b and central member 64b can be rotated about axis B in a second degree of freedom, which causes central member 64a to rotate about axis E.

The flexure couplings 66a and 66b between ground member 60 and extension members 62a and 62b are substantially aligned with the base axes A and B, respectively, thus allowing bending and rotation about those axes. The flexure couplings 68a and 68b between extension members 62a and 62b and central members 64a and 64b are substantially aligned with the floating axes D and E, respectively, thus allowing bending and rotation of the central members about those axes. The flexible coupling 70 between the central members 64a and 64b is substantially aligned with a normal axis C that extends approximately perpendicularly from a plane formed by the base axes A and B when the central members are in the origin position. When the manipulandum and mechanism is in the origin position, the axes A, B, C, D, and E intersect approximately at a single point P. In other embodiments, some or all of the flexure couplings can be positioned as to not be aligned with the axes of rotation of the mechanism.

In alternate embodiments, one or more additional degrees of freedom can be provided. For example, manipulandum 56 can be rotated about axis C extending perpendicularly from the plane formed by floating axes D and E, where a rotational bearing or flexure can provide rotation. Or, manipulandum 56 can be linearly translated along floating axis C. These degree of freedom can be sensed and actuated, if desired. A similar five-bar structure is also disclosed in U.S. Pat. Nos. 5,731,804, 5,767,839, and 6,104,382 and copending patent application Ser. No. 09/138,304 filed Aug. 21, 1998, which are all incorporated by reference herein.

The gimbal mechanism 52 of the present invention provides a multi-segment flexure (unitary member) in which the flexure couplings provide a flex compliance to allow the members of the linkage to rotate. The unitary member can be made of a material such as plastic, rubber, metal, or the like, that provides torsion flex in a particular desired degree of freedom where the material is thinned in a particular dimension as shown for the flexure couplings. Each flexure coupling is implemented such that the thickness of the unitary member material is relatively small in the dimension in which the flexure coupling is to flex, and relatively wide in the dimensions in which the flexure coupling is desired to remain rigid. For example, the coupling 66a is thin and compliant in the direction perpendicular to axis A, but is thick in the direction parallel to axis A. This allows the member 62a to rotate about axis A with reference to the ground member 60, but rotation in other dimensions is resisted. The members 60 and 62a are sufficiently thick in all dimensions to remain rigid so that flexure only occurs at the designated couplings.

Furthermore, in the described embodiment, each flexible coupling 66 and 68 only bends and allows rotation about only one axis of rotation and does not twist or allow the members to twist. This is because the members 62 and 64 are thick enough to prevent any flex, while the coupling portions 66 and 68 are provided in particular locations and are thin enough to allow the bending only in the desired directions. The result from all these features is a mechanism with sufficient stiffness to accurately transmit motion of the manipulandum to sensors 74 and also to accurately transmit forces from actuators 70 to the manipulandum with minimal compliance and backlash. Herein, the term "flex" is intended to refer to any sort of flexibility in a member, coupling, or segment. Types of flex described herein include "twist" (torsion flex) and "bending." Twist is the torque twisting motion about a member's or coupling's lengthwise axis, and bending is the relative movement of the two ends of a member or coupling towards or away from each other. Other embodiments may include one or more flexure couplings allowing twist.

In the particular embodiment shown, the flexure couplings are positioned to receive any load or force on the central members or user manipulandum applied by the user when contacting the manipulandum. Each flexure coupling 68 extends approximately perpendicularly (down as shown in FIG. 3) from the extension member 62 and then curves back up to the adjoining central member 64. Thus, when force is applied downwardly on the central members from the user contacting the manipulandum, the force causes the portions of the flexure coupling to pull away from each other, causing the joint to be in pulling tension and allowing greater structural cohesion. The flexure couplings 66 between the ground member 60 and extension members 62 are similarly oriented in a downward fashion to provide tension in the joints and maximize structural integrity of the coupling. If the coupling were directed upward directly from the extension member to the central member, or if the coupling were extended directly from the extension member horizontally in a plane parallel to axes A and B, the downward user force on the mechanism would cause a pushing or transverse force on the coupling, possibly causing the coupling to buckle or deform in an undesired way.

Since the members 60, 62a, 64a, 64b, and 62b are formed as a unitary part, bearings or joints between these members do not need to be separately manufactured and an extensive assembly process for these members of the linkage is not necessary. For example, the entire gimbal mechanism 52 can be formed from a single plastic mold, with all couplings and members formed intact at one molding event, reducing parts count and assembly costs. Furthermore, other features add to the ease of manufacturability of the gimbal mechanism; for example, the mechanism includes no undercuts, allowing a simpler mold to be used in forming the gimbal mechanism 52. Also, the bottom surfaces of the central members are preferably in substantially the same plane as the top surfaces of the extension members 62; this also allows a simpler mold to be used. Furthermore, since the grounded member 60 is part of the gimbal mechanism, the alignment of the transducers 54 is dictated by the gimbal mechanism and the entire assembly (mechanism and transducers) can be placed in the appropriate housing by securing the ground member 60, thus easing the assembly process. In contrast, embodiments providing separate members which must be connected with separate bearings require that the separate bearings be obtained and that the members and transducers be aligned, assembled and fastened together, greatly adding to the cost of the device. In consequence, the gimbal mechanism 54 is significantly less expensive to produce than other types of five-bar mechanisms. This allows the interface device 10 to be manufactured for the high-volume consumer market while still providing an accurate and realistic force feedback interface to the user.

The gimbal mechanism 52 of the present invention provides its members and flexure couplings in a particular orientation that maximizes ease of rotation in the desired dimensions yet provides sufficient support in the other dimensions to allow accurate motion and force feedback to be transmitted through the gimbal mechanism. For example, the ground member 60 is provided as the main grounded support for the gimbal mechanism 52 and is an integral part of the unitary flexure member. This support allows the shaft of transducers 54 to be directly coupled to the extension members 62 without the use of a bearing connected between actuator and extension member, thereby saving purchase and assembly cost. Furthermore, the ground member 60, extension members 62, and central members 64 are oriented to provide the required motion and rigid support in a compact area. The ground member 60 provides two sides 72 at right angles to each other and substantially aligned with the axes A and B. An extension member 62 is coupled at each side 72 along a substantial portion of the side's length, maximizing the rigidity in directions perpendicular to the axis parallel to that side. The extension members 62 are oriented such that the flexible couplings 66 and 68 at each end of the extension member are perpendicular to each other in the same plane, and where the coupling 68 is substantially aligned with the coupling 66 of the other extension member along an axis of rotation A or B. In addition, the central members 64 are oriented to take advantage of the third dimension perpendicular to the plane of the axes A and B, where the central members extend up and toward the ground member 60, adding to the compactness of the mechanism, and joining at hinge 70.

The configuration shown can be altered in other embodiments. For example, the central members 64 can extend from below the plane of the extension members toward the area above that plane. Or, the extension members or central members can be shaped in different ways. Furthermore, the manipulandum 18 can in some embodiments be formed as part of the unitary member in a single mold.

In other embodiments, some of the members 60, 62a, 64a, 64b, and 62b can be formed separately from other members, e.g., less than the five flexure couplings shown in FIG. 3 can be used. For example, the embodiment of FIGS. 6a–6c, below, provides a unitary member including members 62a, 64a, 64b, and 62b, which is separately formed from a ground member 60. Alternatively, extension member 62a and central member 64a can be formed together as segments of one unitary piece, while extension member 62b and central member 64b can be formed together as segments of a second unitary piece. In such an embodiment, a rotational bearing, for example, can be provided between the central members 64a and 64b. When less than the five flexure couplings are used, rotational bearings can be used in place of the flexure couplings. Some alternative designs are presented in U.S. Pat. No. 5,805,140, incorporated herein by reference.

In should be noted that, in some embodiments, the user manipulandum 18 (shown in FIG. 2) can be translatable in a third degree of freedom along axis C by slidably coupling the manipulandum to either of the central members 64a or 64b. Likewise, a rotational coupling or bearing can be coupling between one of the central members 64 and the manipulandum 18.

Two transducers 54a and 54b are included to sense motion in the two degrees of freedom of manipulandum 56 and, in some embodiments, to output forces on the manipulandum in those degrees of freedom. Transducer 54a includes an actuator 70a and a sensor 72a, and transducer 54b includes an actuator 70b and a sensor 72b. Each actuator 70 has a housing that is grounded (e.g., coupled to the housing 14 of the interface device 10) and has a rotating shaft which is coupled to an extension member 62. Actuator 70a outputs a force (torque) on the extension member 62a about axis A, and actuator 70b outputs a force (torque) on the extension member 62b about axis B, thereby transmitting these forces to the manipulandum 18 via central members 64.

Actuators 70 are preferably "direct drive" actuators, i.e., each actuator is connected directly to the gimbal mechanism 52 and there is no drive transmission positioned between the actuator and the gimbal mechanism or manipulandum 18. Although such transmissions, such as belt drives, cable drives, and gear drives, allow forces output on the manipulandum 18 and sensing resolution to be amplified, in the present invention such amplification is typically unnecessary since actuator 70 is capable of producing a torque of sufficient magnitude for intended applications and sensing resolution is typically adequate for joystick applications. For example, such applications include force feedback on a finger joystick 20, a small sphere, or a dial, which typically require less force magnitude than other devices such as full-sized joysticks and steering wheels. Of course, in other embodiments a drive transmission can be included in device 10 between the actuator and/or sensor and the gimbal mechanism 52. Such transmissions are described in greater detail in U.S. Pat. No. 5,731,804 and copending patent application Ser. No. 09/138,304, both incorporated herein by reference.

Actuators 70 can be of a variety of types, including active actuators or passive actuators. Active actuators include linear current control motors, stepper motors, voice coils, torquer, hydraulic or pneumatic actuators, etc. Passive actuators include magnetic particle brakes, passive fluid-controlled actuators, etc. In one preferred embodiment, the actuators 70 are small rotary actuators which are suitable for inclusion in a handheld controller such as shown in FIG. 1; this embodiment is described in greater detail with respect to FIGS. 5c and 5d. In still other embodiments, linear actuators can be used to provide a force in a linear degree of freedom, which can be converted to a rotary degree of freedom for use with gimbal mechanism 52 by mechanisms well known to those skilled in the art.

Sensor 72a can be included in the same housing as actuator 70a and is coupled to the rotating shaft (rotor) of the actuator 70a, and sensor 72b is likewise included with actuator 70b and coupled to the rotating shaft of actuator 70b. Sensor 72a senses rotational motion and/or position of extension member 62a about axis A, which is in turn indicative of the motion or position of manipulandum 18 in that degree of freedom. Similarly, actuator sensor 72b senses the motion or position of manipulandum 18 about axis B. In the described embodiment, sensors 72 are digital optical encoders which typically each include a rotating disc or arc that rotates with the rotating shaft of the actuator and a pattern of marks or apertures provided on the disc which is sensed by an emitter-detector pair directing a beam of electromagnetic energy onto or through the disc, as is well known to those skilled in the art. Preferably, a quadrature sensor is used which includes two individual detectors in the detector assembly which are spaced 90 degrees out of phase to allow the direction of rotation of the disc to be detected. Such encoders are well known to those skilled in the art. Furthermore, in some embodiments an "octature" sensor can be used, which provides two additional detectors spaced to provide a total of four signals 45 degrees out of phase with the other detector signals. This provides double the sensing resolution of quadrature sensors. Such octature sensors are described in greater detail in copending patent application Ser. No. 09/071,136, filed Apr. 30, 1998 and incorporated herein by reference.

Sensors 72 can be provided separately from actuators 70 in different locations in other embodiments. For example, the emitters and detectors and encoder pattern can be positioned at other locations on the gimbal mechanism 52 with respect to the actuator 70. Furthermore, other types of sensors may be used, such as analog potentiometers, optical sensors, photodiode sensors, photoresistor sensors, capacitive sensors, Hall effect sensors, etc.

FIGS. 4a–4d are perspective views demonstrating the motion of the gimbal mechanism 52 in two degrees of freedom. When manipulandum 18 is moved, the bending ability of the central members 64a and 64b cause the angle θ between the central members to increase or decrease. For example, in the origin position shown in FIG. 3, the angle θ is about 90 degrees (between the lower portions of the central members). This angle changes when the manipulandum is moved. In all of FIGS. 4a–4d, the manipulandum 18 can be coupled to either of the central members.

Figure 4A:
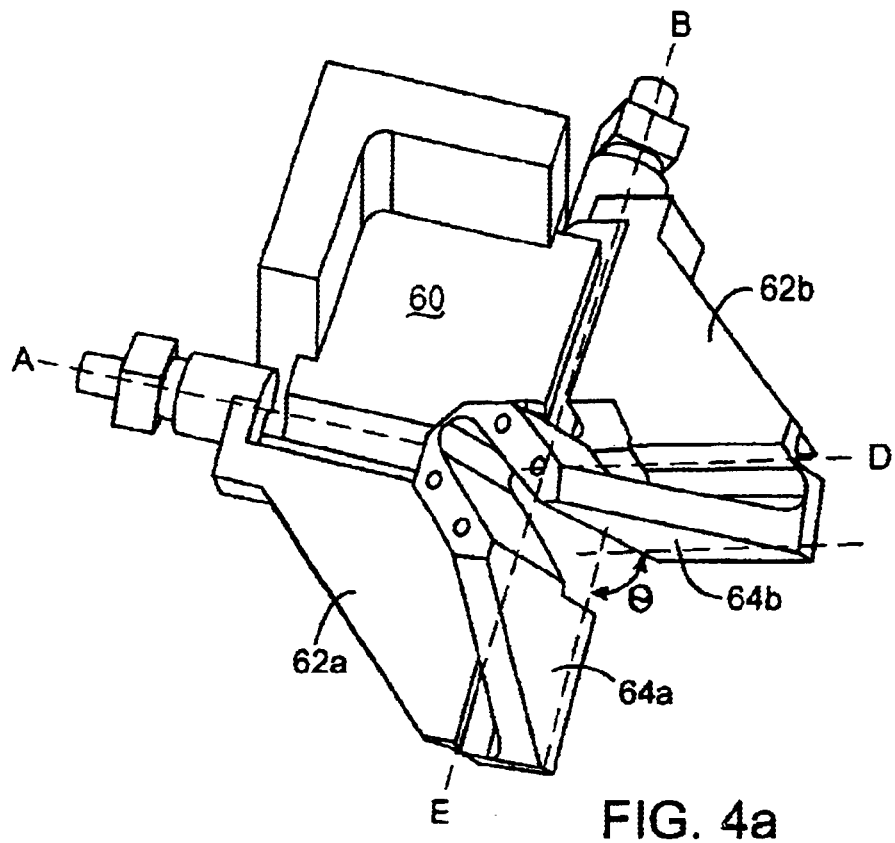
FIGS. 4a–4d are perspective views of the gimbal mechanism of FIG. 3 moved to different positions.
Figure 4B:
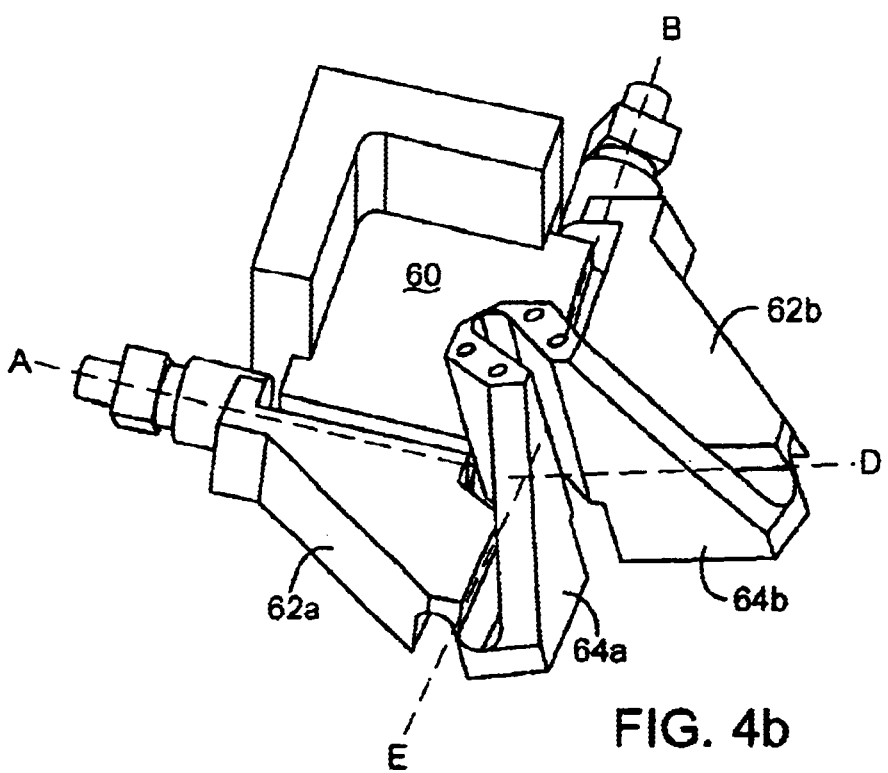
Figure 4C:
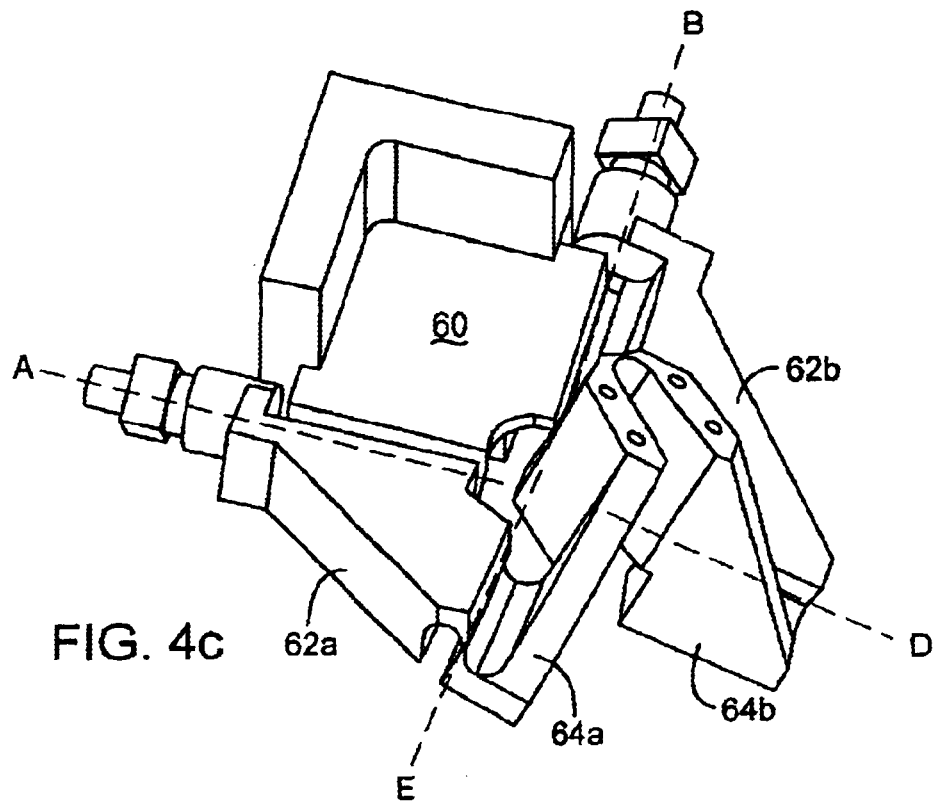
Figure 4D:
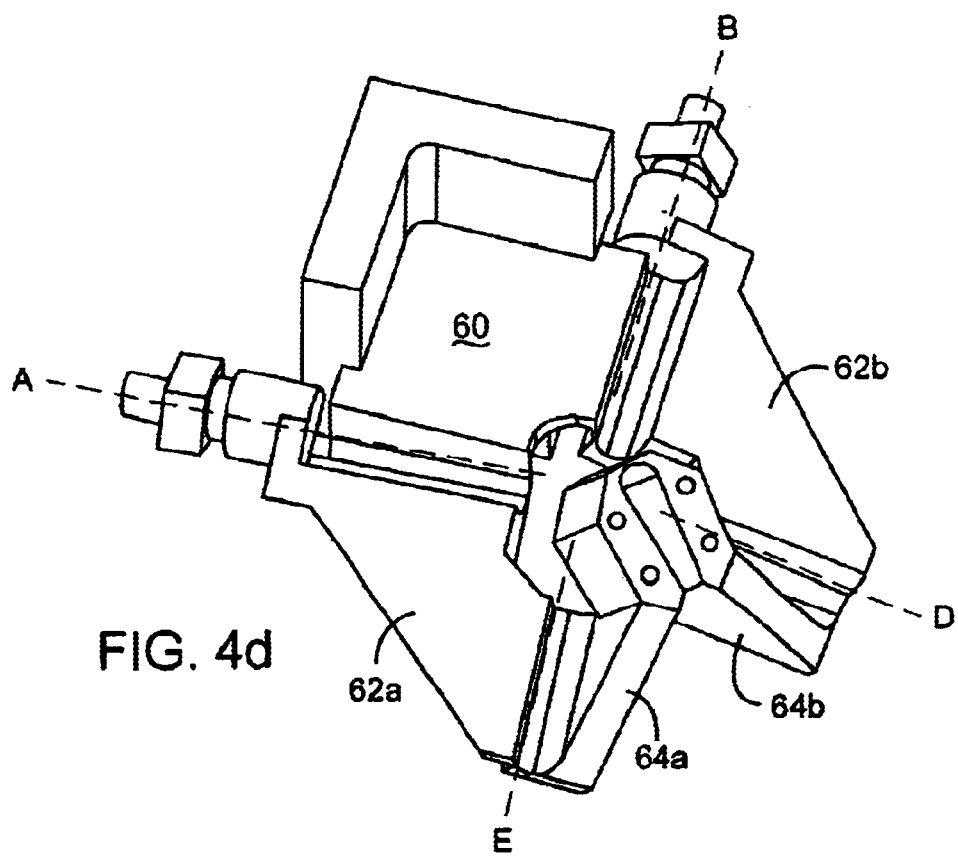

In FIG. 4a, the central members 64a and 64b have been moved to the left as shown in the figure, causing rotation about axis B and a small amount of rotation about axis A. Furthermore, the central members 64a and 64b have rotated slightly with respect to each other, thus increasing the angle between the central members. In FIG. 4b, the central members have been moved diagonally toward the ground member 60, causing rotation of all the flexure couplings as shown and a decrease in the angle between the central members. In FIG. 4c, the central members 64a and 64b have been moved to the right, causing the appropriate members to flex and causing an increase in the angle between central members. Finally, in FIG. 4d, the central members have been moved diagonally away from the ground member 60, causing the members to flex as shown and the angle between the central members to decrease.

Figure 5A:
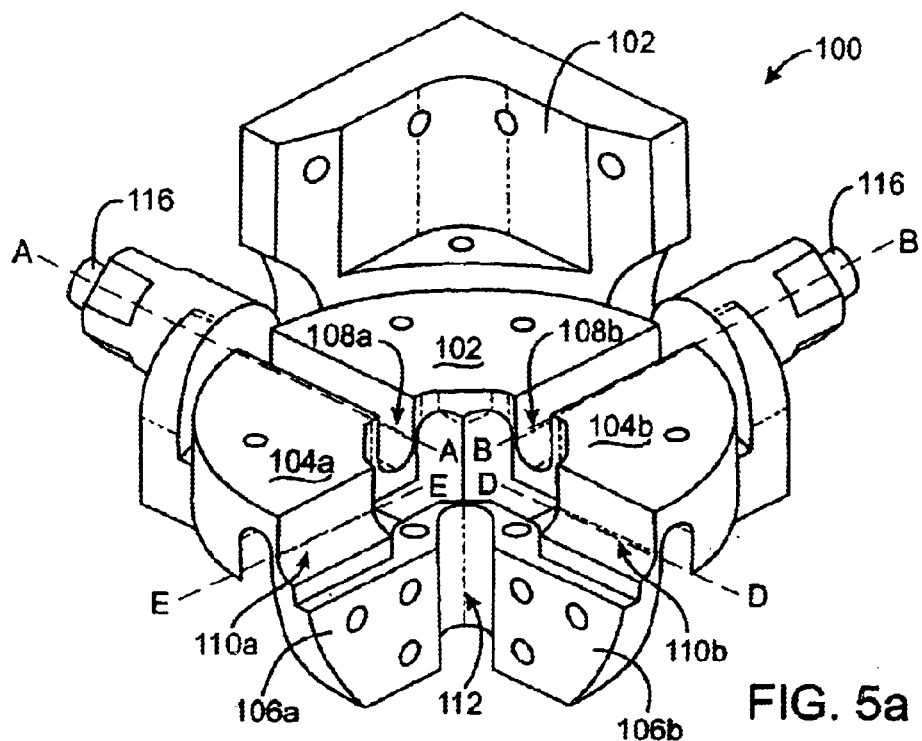
FIGS. 5a–5b top and bottom perspective views, respectively, of an alternate embodiment of the flexure gimbal mechanism of FIG. 3.
Figure 5B:
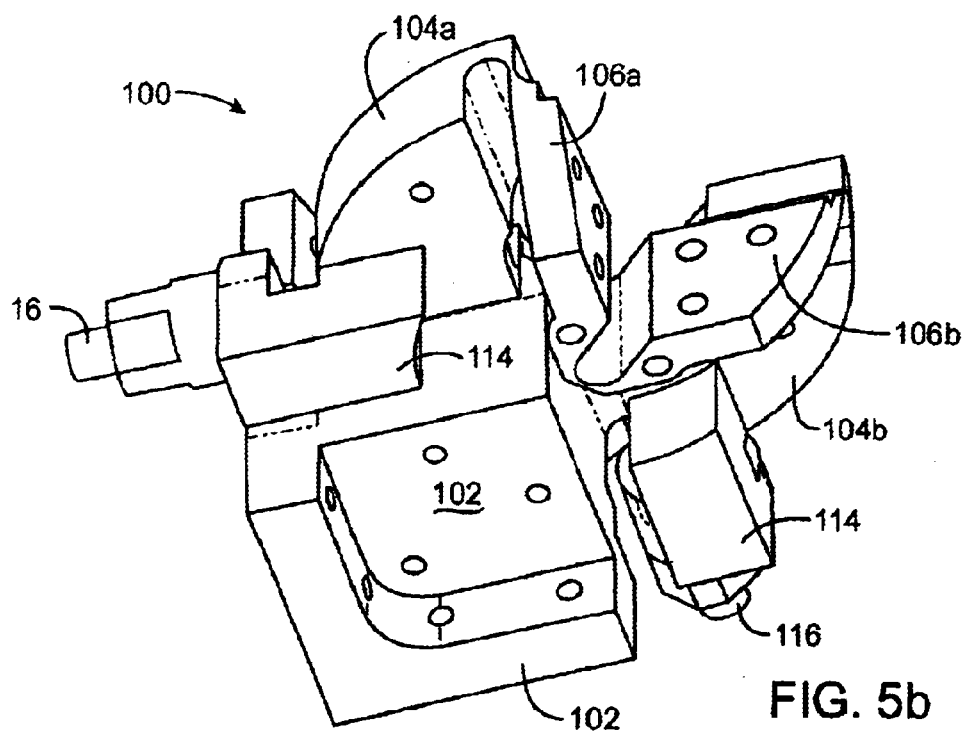
Figure 5C:
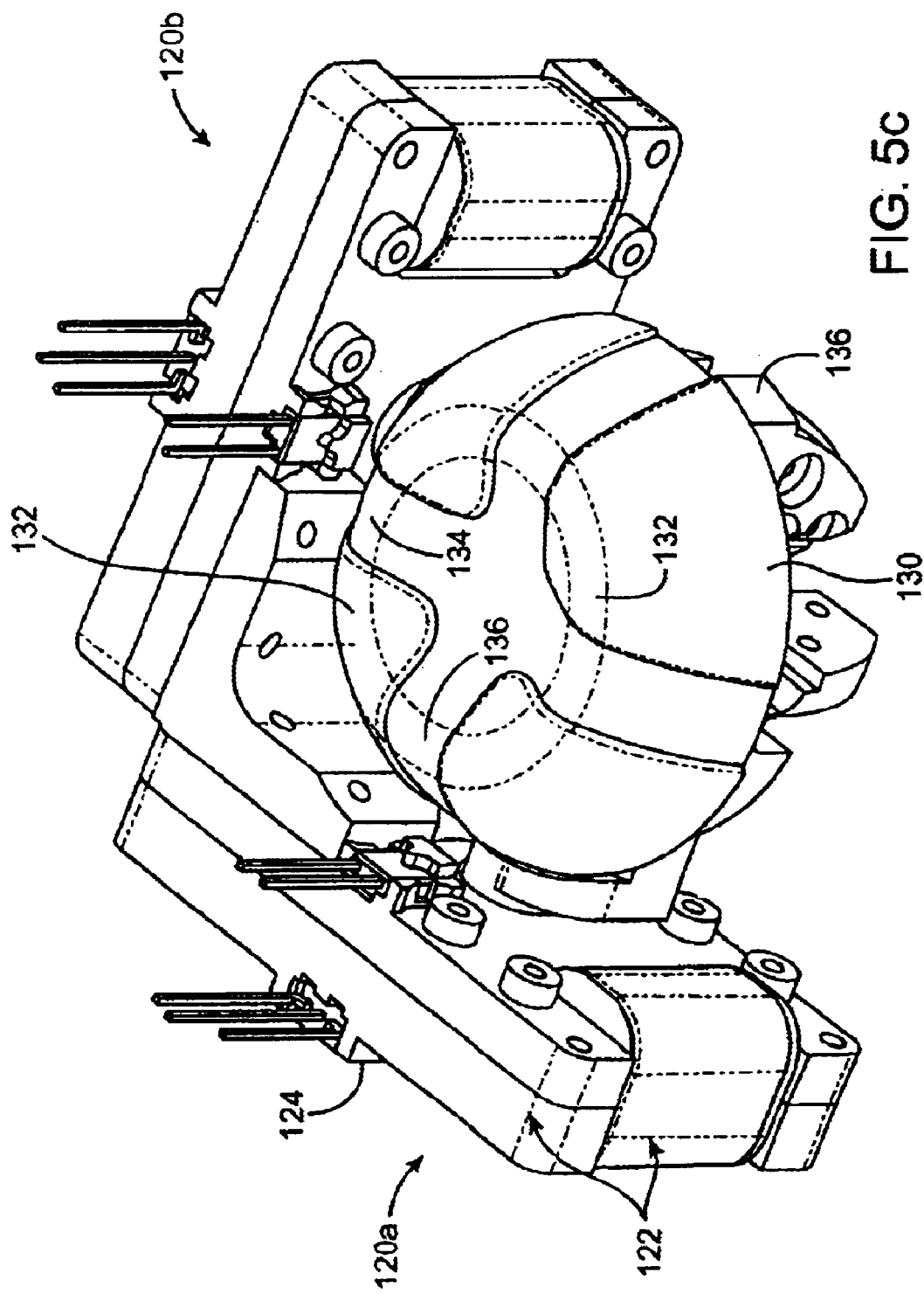
FIG. 5c is a perspective view of the gimbal mechanism of FIGS. 5a and 5b including a sphere portion manipulandum and compact actuators.

FIGS. 5a–5b are perspective views of an alternate embodiment 100 of the gimbal mechanism of FIGS. 2 and 3. FIG. 5a shows a view of the top side of the mechanism, and FIG. 5b shows a view of the bottom side of the mechanism. Mechanism 100 operates substantially similarly to the mechanism 25 shown in FIG. 3. A ground member 102 is coupled to ground, extension member 104a is flexibly coupled to ground member 102 by flexure coupling 108a, central member 106a is flexibly coupled to extension member 104a by flexure coupling 10a, central member 106a is coupled to central member 106b by flexure coupling 112, central member 106b is coupled to extension member 104b by flexure coupling 110b, and extension member 104b is coupled to ground member 102 by flexure coupling 108b. Rotation about axes A and B and floating axes D and E are similar to the operation described above with respect to FIG. 3.

Mechanism 100 differs from the embodiment of FIG. 3 in that central members 106 extend downwardly out of the plane formed by axes A and B, instead of upwardly as in FIG. 3. This configuration can be more appropriate for certain manipulandums, as shown below in FIG. 5c. Supports 114 can be provided under the extension members 104 to help support the mechanism structure. The mechanism 100 preferably includes flexure couplings 108 and 110 oriented as to provide tension in the joint and increase the stability of the joints, as explained above for the embodiment of FIG. 3. In some embodiments, travel-limiting stops can be incorporated into the unitary piece of the mechanism to limit motion of the manipulandum to a desired range. For example, stops can be included on the upper surface of member 62a near the flexure coupling 66a and on the side of member 64a so that the central member contacts the stop when it reaches a desired limit. Such stops should not be allowed to stress the joints of the mechanism; in general, stops located closer to the manipulandum provide less stress on the mechanism 52. Stops can also be included in the transducers 54 or as part of the housing 14 of the device.

Transducers such as actuators and sensors are preferably coupled to the extension members 104a at connection members 116, similarly to the embodiment of FIG. 3.

Figure 5D:
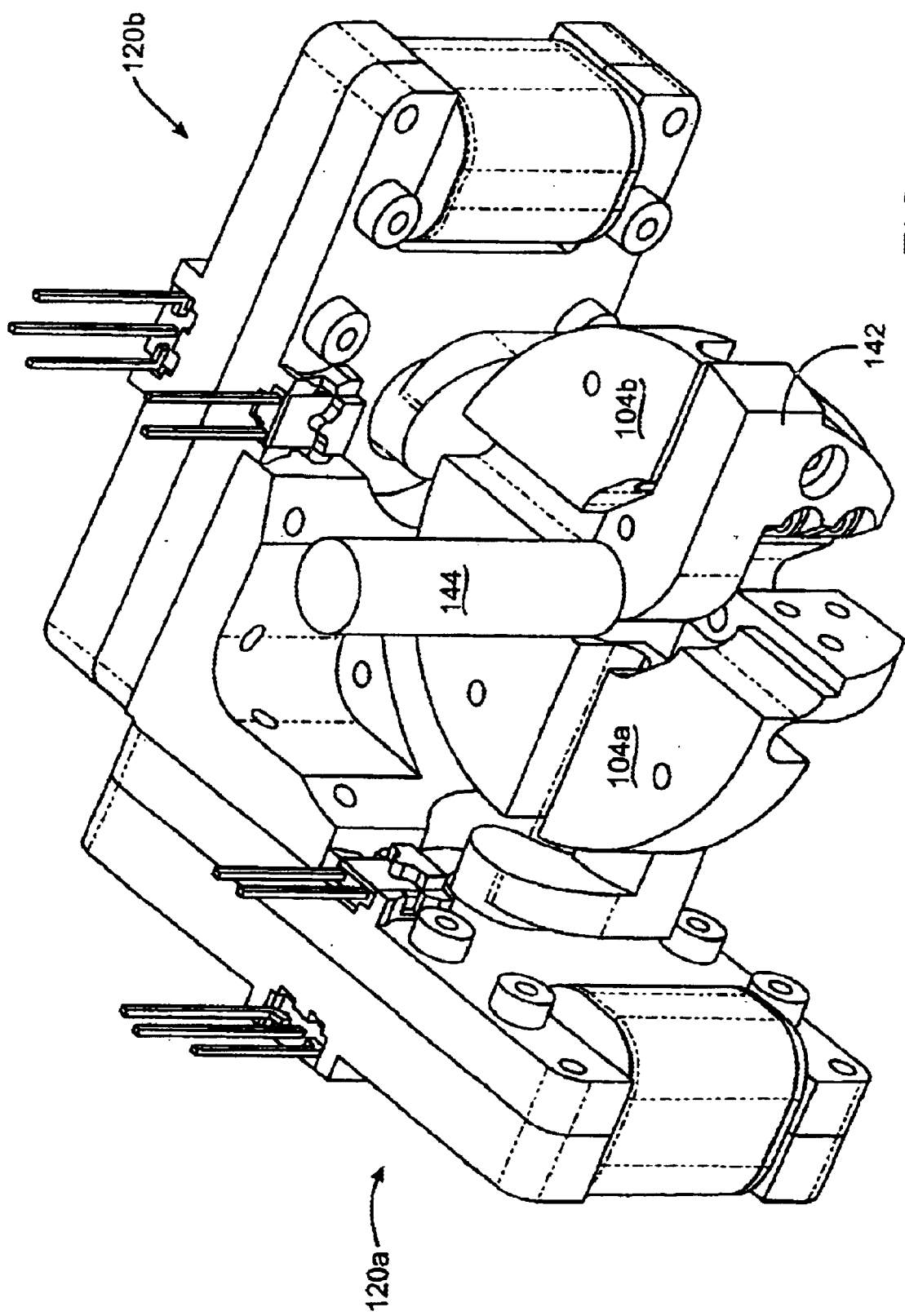
FIG. 5d is a perspective view of the gimbal mechanism of FIGS. 5a and 5b including a joystick manipulandum and compact actuators.

FIGS. 5c and 5d are example embodiments of the gimbal mechanism 100 of FIGS. 5a and 5b including transducers and a manipulandum. In FIG. 5c, compact rotary transducers 120 are connected to the extension members 104. Transducers 120 each include an actuator 122 and a sensor 124. Actuator 122 preferably uses two coils and a central rotor, providing a limited rotary range. This actuator is described in greater detail in copending provisional application Ser. No. 60/133,208, filed May 7, 1999, and incorporated herein by reference. Sensor 124 includes an emitter detector pair and an encoder wheel or arc (not shown), where the encoder wheel is coupled to the rotating shaft of the actuator. A preferred sensor is described in copending application Ser. No. 60/133,208.

FIG. 5c also shows a manipulandum 130 which is a portion of a sphere with a top region flattened to create an edge 132 with the user can push in different directions. The manipulandum 130 is coupled to the central member 104b by an extension 136, where the extension is coupled to a central point on the underside of the manipulandum 130. A similar extension is shown in greater detail with respect to FIG. 5d. A user preferably uses a thumb or finger to move an edge 132 of the manipulandum in a desired direction within the two allowed degrees of freedom, similar to a directional pad. For example, the forward portion 134 of the edge 132 can be pushed to cause a direction signal in the "up" direction, a left portion 136 of the edge 132 can be pushed to cause a signal in the "left" direction, etc. Force feedback is provided in the two degrees of freedom in appropriate embodiments.

FIG. 5d illustrates an embodiment of an interface device including gimbal mechanism 100 where the transducers 120a and 120b are used as described with reference to FIG. 5c, and where a joystick manipulandum 140 is used instead of the portion of the sphere shown in FIG. 5c. Joystick 140 includes an extension portion 142 which is coupled to central member 104b (which could alternatively be coupled to central member 104a) and is coupled to an end of an upright joystick handle 144. The operation of the gimbal mechanism 100 is described with reference to FIGS. 5a and 5b.

Figure 6A:
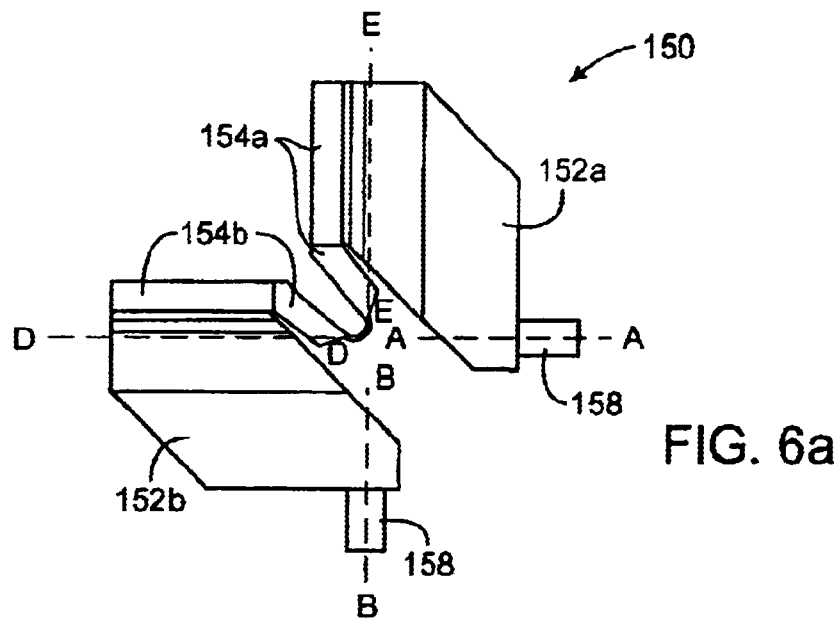
FIGS. 6a–6b are top plan and side elevational views, respectively, of a second alternate embodiment of the flexure gimbal mechanism of FIG. 3.
Figure 6B:
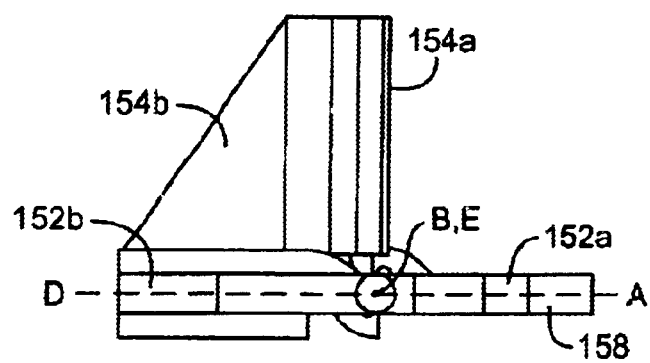

FIGS. 6a–6i are side elevational and perspective views of an alternate embodiment 150 of the gimbal mechanism 25 of the present invention. FIGS. 6a and 6b are top and side elevational views, while FIGS. 6c–6i are perspective views of the alternate gimbal mechanism.

Gimbal mechanism 150 is a unitary flexure, similar to the embodiments described above. An extension member 152a is flexibly coupled to a central member 154a, which is flexibly coupled to central member 154b. Member 154b is flexibly coupled to extension member 152b. However, unlike the embodiment of FIG. 3, the flexible unitary member does not include a ground member, such that the extension members 152 are not coupled together as part of the unitary member. Instead, transducers 156, such as actuators and/or sensors, are connected to the extension members 152 at the connection portions 158, so that three flexure couplings are used instead of the five of FIG. 3. Transducers 156 are shown in the perspective view of FIG. 6c. The transducers 156 can be connected to the extension members by rotatable bearings in a ground member, for example; in one embodiment, an L-shaped ground member can be provided to couple the extension members 152 together and provide structural support for the mechanism. In other embodiments, the transducers 156 can be directly coupled to the extension members 152 and provide the grounding for the mechanism. Thus the ground member for the gimbal mechanism 150 is not part of the unitary flexure, but is coupled to the mechanism through a rotatable bearing or through the grounded transducers. This tends to make the cost and assembly of the mechanism 150 more expensive than the embodiments shown in FIGS. 3 and 5a–5b.

Figure 6C:
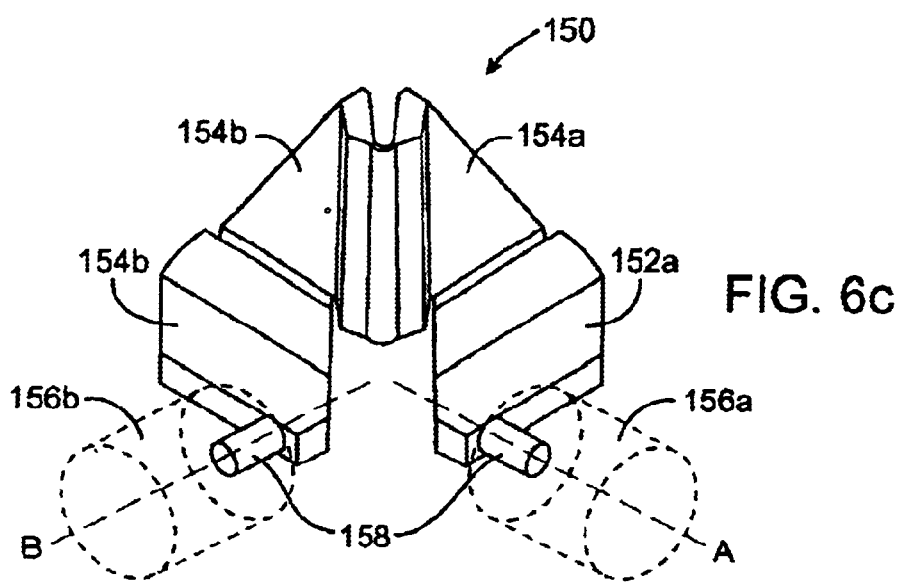
FIG. 6c is a perspective view of the gimbal mechanism of FIGS. 6a and 6b.
Figure 6D:
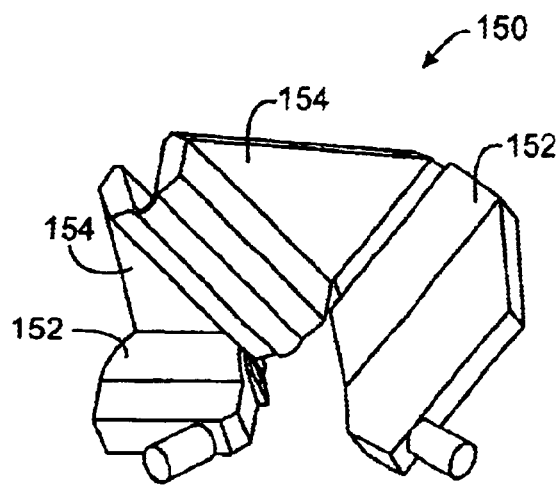
FIGS. 6d–6f are perspective views of the gimbal mechanism of FIG. 6c at different positions.
Figure 6E:
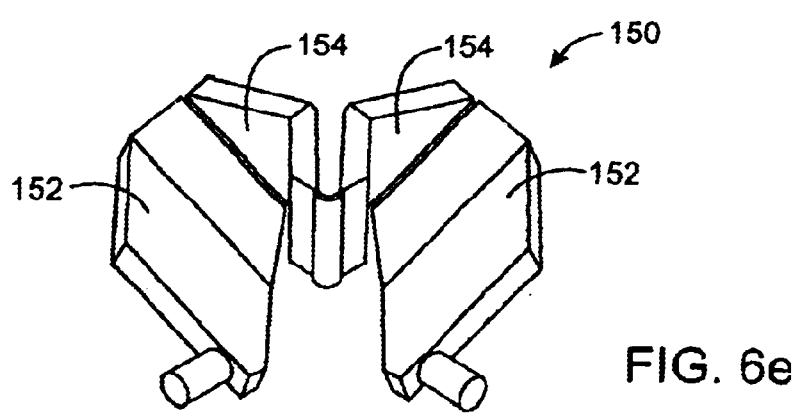
Figure 6F:
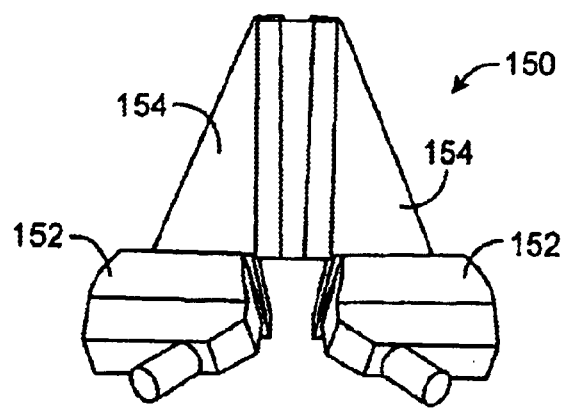
Figure 6G:
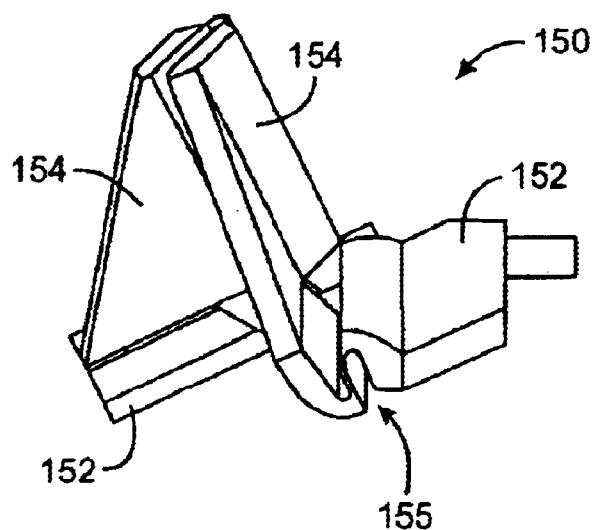
FIGS. 6g–6i are side elevational views of the gimbal mechanism of FIG. 6c at different positions.
Figure 6H:
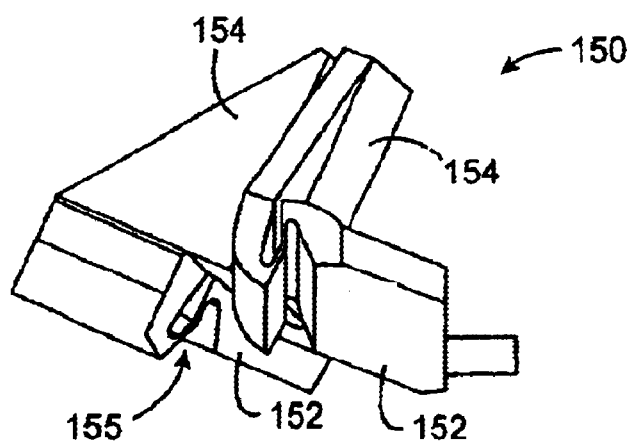
Figure 6I:
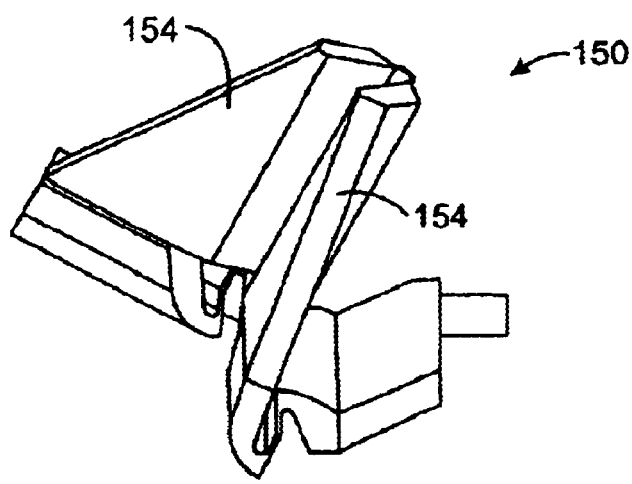

FIGS. 6d–6f are perspective views showing the gimbal mechanism 150 in the same orientation as shown in FIG. 6c, except that the central members 154 have been rotated to the left (FIG. 6d), forward in a direction out of the page (FIG. 6e), and backward in a direction into the page (FIG. 6f). FIGS. 6g–6i similarly show side elevational views of the gimbal mechanism 150 showing the central members 154 in three different positions in the two degrees of freedom. These views show that the flexure couplings 155 are preferably oriented approximately perpendicularly to the members 152 to provide a pulling tension on the couplings from the weight of the user's contact on the manipulandum, similar to the embodiment of FIG. 3.

Figure 7:
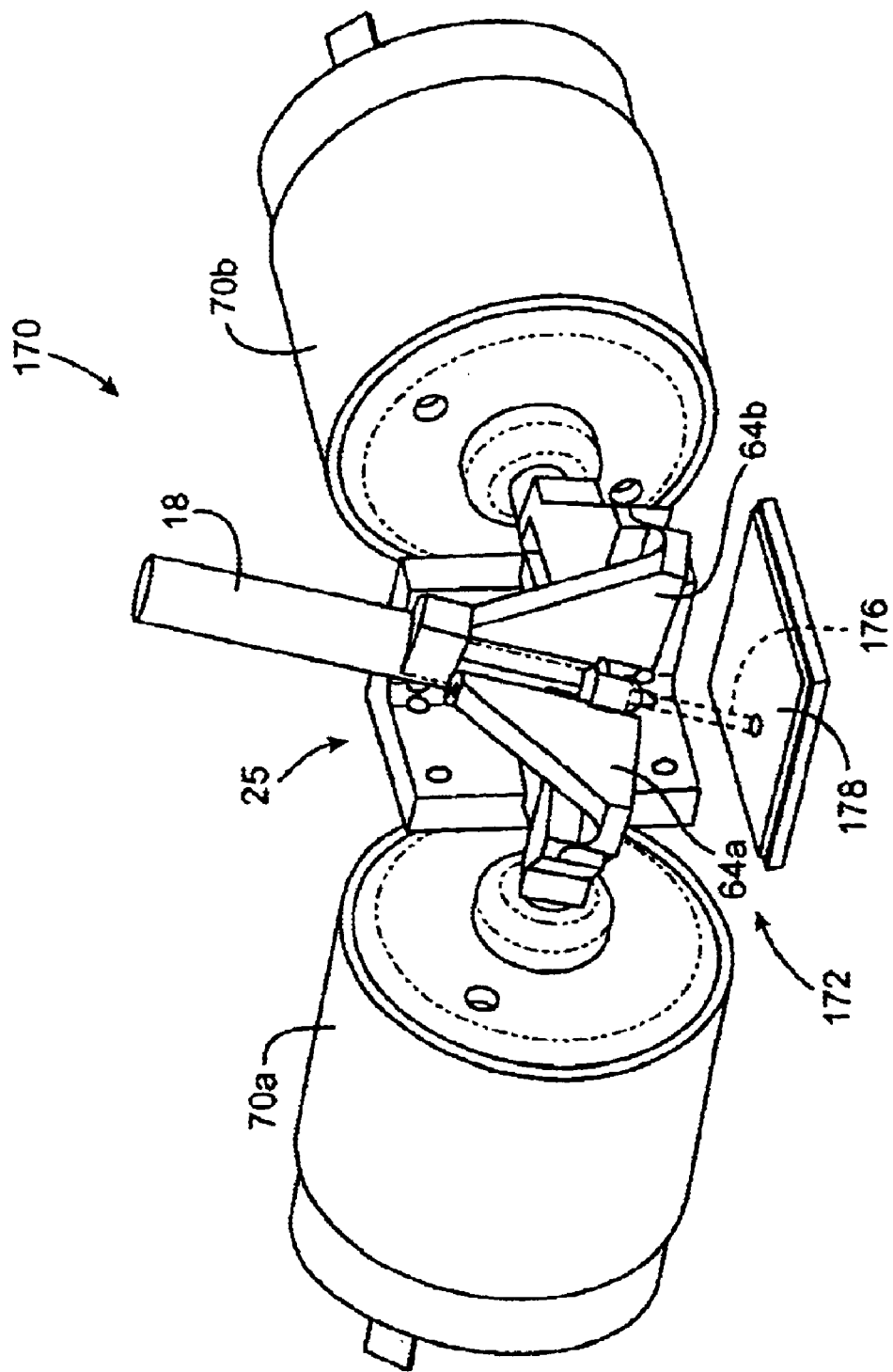
FIG. 7 is a perspective view of an alternate embodiment of the mechanical system of FIG. 3 using a single sensor.

FIG. 7 is a perspective view of an alternative embodiment 170 of the interface device 10 of FIGS. 2 and 3. In embodiment 170, a single sensor 172 is used to detect motion of the manipulandum in two degrees of freedom. An emitter 174 is positioned on the underside of the central member 64b (or central member 64a) and emits a beam 176 onto a planar detector 178. Detector 178 can detect the position of the beam with reference to the two dimensions of the plane of the detector, e.g., the X and Y position of the point where the beam impinges on the detector. Thus, as the manipulandum and central members are moved in the two rotary degrees of freedom, the emitter moves therewith and causes the beam to be moved across the surface of the detector by an amount in proportion to the movement of the manipulandum. The detector provides the location of the emitted beam to a processor, which determines the magnitude and direction of movement of the manipulandum using the detector signals.

The emitter can be any of well known emitters of electromagnetic radiation, such as an infrared light emitting diode. Planar detector 178 can be a well-known photosensitive array, CCD, or other detection device. The sensor 172 can be used in any of the embodiments described herein.

Figure 8:
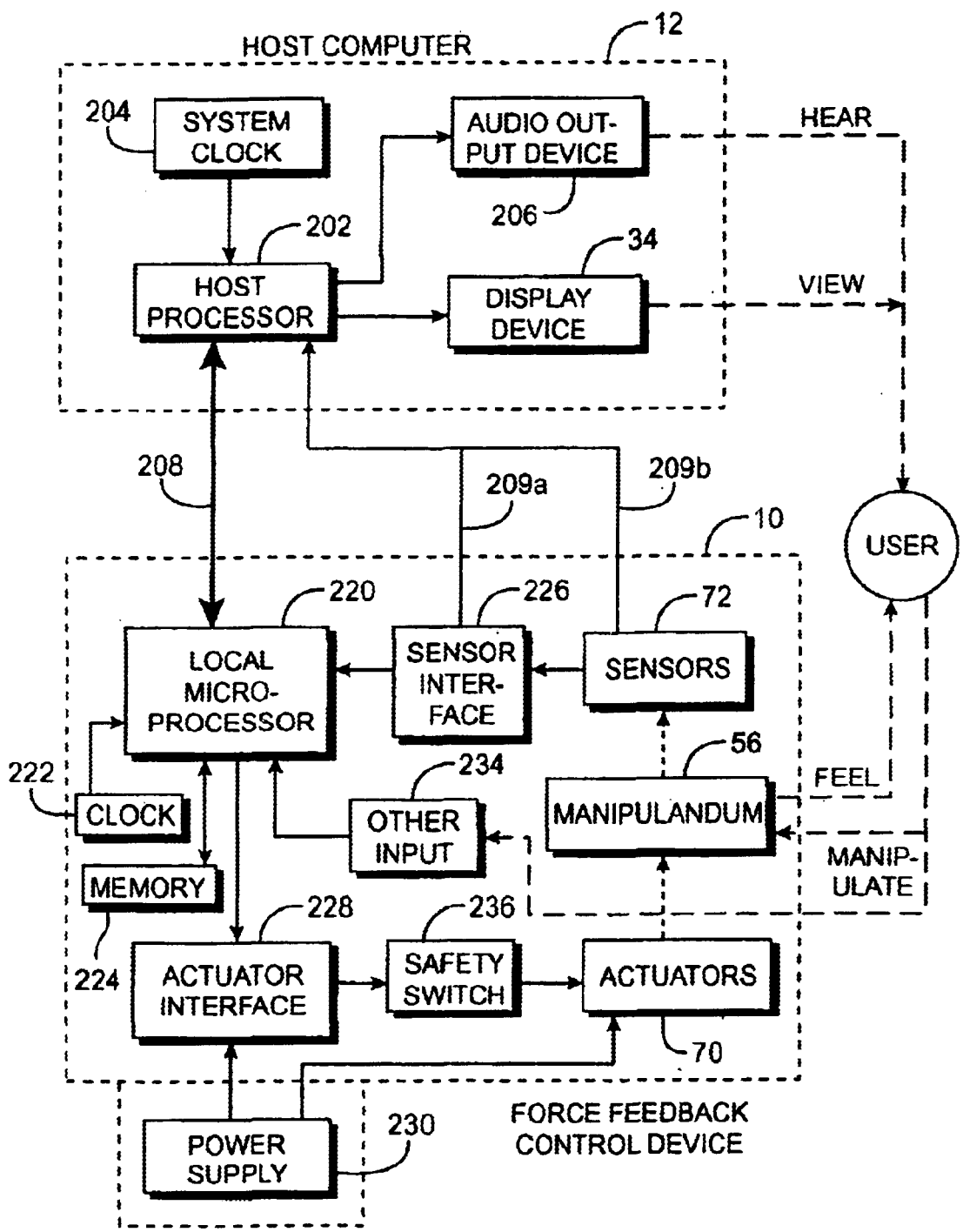
FIG. 8 is a block diagram illustrating the interface device and host computer for use with the present invention.

FIG. 8 is a block diagram illustrating the force feedback device 10 and host computer 12 suitable for use with the present invention. Interface device 10 can be any of the embodiments described above. A system similar to that of FIG. 11 is described in detail in U.S. Pat. No. 5,734,373 which is incorporated herein by reference in its entirety.

As explained with reference to FIG. 1, host computer 12 is preferably a personal computer, video game console, workstation, or other computing or display device. Host computer 12 commonly includes a host microprocessor 202, a clock 204, a display device 34, and an audio output device 206. Host microprocessor 202 can include a variety of available microprocessors from Intel, AMD, Motorola, or other manufacturers. Microprocessor 202 can be single microprocessor chip, or can include multiple primary and/or co-processors and preferably retrieves and stores instructions and other necessary data from random access memory (RAM) and read-only memory (ROM) as is well known to those skilled in the art. In the described embodiment, host computer 12 can receive sensor data or a sensor signal via bus 208 from sensors of device 10 and other information. Microprocessor 202 can receive data from bus 208 using I/O electronics, and can use the I/O electronics to control other peripheral devices. In appropriate embodiments, host computer system 12 can also output commands to interface device 10 via bus 208 to cause force feedback.

Clock 204 can be a standard clock crystal or equivalent component used by host computer 12 to provide timing to electrical signals used by host microprocessor 202 and other components of the computer 12 and can be used to provide timing information that may be necessary in determining force or position values. Display device 34 is described with reference to FIG. 1. Audio output device 206, such as speakers, can be coupled to host microprocessor 202 via amplifiers, filters, and other circuitry well known to those skilled in the art. Other types of peripherals can also be coupled to host processor 202, such as storage devices (hard disk drive, CD ROM drive, floppy disk drive, etc.), printers, and other input and output devices.

Interface device 10 is coupled to host computer 12 by bidirectional bus 208, which sends signals in either direction between host computer 12 and the interface device 10. Bus 208 can be a serial interface bus, such as USB, RS-232, or Firewire (IEEE 1394), providing data according to a serial communication protocol, a parallel bus using a parallel protocol, or other types of buses. An interface port of host computer 12, such as a USB or RS232 serial interface port, can connect bus 208 to host computer 12.

Interface device 10 can include a local microprocessor 220, local clock 222, local memory 224, sensor interface 226, and actuator interface 228. Device 10 may also include additional electronic components for communicating via standard protocols on bus 208.

Local microprocessor 220 preferably coupled to bus 208 and is considered "local" to device 10, where "local" herein refers to processor 220 being a separate microprocessor from any processors 202 in host computer 12. "Local" also preferably refers to processor 220 being dedicated to haptic feedback and sensor I/O of the device 10, and being closely coupled to sensors and actuators of the device 10, such as within the housing 14. Microprocessor 220 can be provided with software instructions to wait for commands or requests from computer host 12, parse/decode the command or request, and handle/control input and output signals according to the command or request. In addition, processor 220 can operate independently of host computer 12 by reading sensor signals and calculating appropriate forces from those sensor signals, time signals, and force processes selected in accordance with a host command, and outputting appropriate control signals to the actuators. Suitable microprocessors for use as local microprocessor 220 include the I-Force Processor or the FEELit Processor from Immersion Corporation, the 8X930AX by Intel Corp., the MC68HC711E9 by Motorola, or the PIC16C74 by Microchip, for example. Microprocessor 220 can include one microprocessor chip, or multiple processors and/or co-processor chips. In other embodiments, microprocessor 220 can include digital signal processor (DSP) functionality, or control logic components or a hardware state machine can be used instead of a microprocessor.

For example, in one host-controlled embodiment that utilizes microprocessor 220, host computer 12 can provide low-level force commands over bus 208, which microprocessor 220 directly transmits to the actuators. In a different local control embodiment, host computer 12 provides high level supervisory commands to microprocessor 220 over bus 208, and microprocessor 220 manages low level force control loops to sensors and actuators in accordance with the high level commands and independently of the host computer 12. In the local control embodiment, the microprocessor 220 can process sensor signals to determine appropriate output actuator signals by following the instructions of a "force process" that may be stored in local memory 224 and includes calculation instructions, conditions, formulas, force magnitudes, or other data. The force process can command distinct force sensations, such as vibrations, textures, jolts, or even simulated interactions between displayed objects. The host can send the local processor 220 force sensation parameters to store in local memory, or can clear other force sensations to load new force sensations in memory. Force feedback used in such embodiments is described in greater detail in co-pending patent application serial Ser. No. 09/305,872, and Pat. No. 5,734,373, both of which are incorporated by reference herein.

A local clock 222 can be coupled to the microprocessor 220 to provide timing data, similar to system clock 204 of host computer 12; the timing data might be required, for example, to compute forces output by actuators 70. Local memory 224, such as RAM and/or ROM, is preferably coupled to microprocessor 220 to store instructions for microprocessor 220 and store temporary and other data.

Sensor interface 226 may optionally be included in device 10 to convert sensor signals to signals that can be interpreted by the microprocessor 220 and/or host computer 12. For example, sensor interface 226 can receive and convert signals from a digital sensor such as an encoder or from an analog sensor using an analog to digital converter (ADC). Such circuits, or equivalent circuits, are well known to those skilled in the art. Alternately, microprocessor 220 or host computer 12 can perform these interface functions. Actuator interface 228 can be optionally connected between the actuators of device 10 and microprocessor 220 to convert signals from microprocessor 220 into signals appropriate to drive the actuators. Interface 228 can include power amplifiers, switches, digital to analog controllers (DACs), and other components well known to those skilled in the art. Power supply 230 can optionally be coupled to actuator interface 228 and/or the actuators 70 to provide electrical power. Alternatively, actuators and other components can draw power from the bus 208 (such as USB) from the host computer. Or, power can be stored and regulated by device 10 and used when needed to drive actuators 70.

Sensors 72 sense the position, motion, and/or other characteristics of particular controls of device 10 as described above. Sensors 72 provide signals to microprocessor 220 including information representative of those characteristics. The sensor 72 or sensor interface 226 can optionally provide sensor signals directly to computer 12 as shown by busses 209a and 209b. Example of sensors suitable for embodiments described herein are digital rotary optical encoders, Hall effect sensors, linear optical encoders, analog sensors such as potentiometers, optical sensors such as a lateral effect photo diode, velocity sensors (e.g., tachometers) and/or acceleration sensors (e.g., accelerometers). Furthermore, either relative or absolute sensors can be employed.

Actuators 70 transmit forces to particular controls of device 10 in one or more directions along one or more degrees of freedom in response to signals output by microprocessor 220 and/or host computer 12, i.e., they are "computer controlled." Actuators 70 are described in greater detail above. In some embodiments of the present invention, passive actuators can be used apply a resistance to the motion of the manipulandum 56, such as magnetic particle brakes, friction brakes, or pneumatic/hydraulic passive actuators.

The manipulandum 56 can be a variety of different objects or manipulandums that are manipulated by a user and which can receive force feedback. For example, manipulandum 56 can be the sphere or finger joystick described above. The housing of the entire device 10 can also be actuated.

Other input devices 234 can optionally be included in device 10 and send input signals to microprocessor 220 and/or host computer 12. Such input devices can include buttons, dials, knobs, switches, voice recognition hardware (with software implemented by host 12), or other input mechanisms as described above. Safety or "deadman" switch 236 can be included in some embodiments of device 10 to provide a mechanism to allow a user to override and deactivate forces output by actuators 70, or require a user to activate actuators 70, for safety reasons. For example, the user can be required to continually activate or close safety switch 236 during manipulation of the device 10 to activate the actuators 70. Embodiments of safety switch 236 include an optical safety switch, electrostatic contact switch, hand weight safety switch, etc.

While this invention has been described in terms of several preferred embodiments, it is contemplated that alterations, permutations, and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations and equivalents as fall within the true spirit and scope of the present invention.

What is claimed is:

1. An interface device manipulated by a user and providing input signals to a host computer, the interface device comprising:

a manipulandum physically contacted by said user and moveable in at least two rotary degrees of freedom;

a five-bar closed-loop mechanism coupled to said manipulandum, said mechanism providing said at least two rotary degrees of freedom with respect to a ground, wherein said mechanism includes four members forming a unitary piece coupled to said ground, wherein said members are coupled to each other by flexible couplings providing flex that allows rotation of said members; and a sensor coupled to said mechanism that senses a position of said manipulandum in at least one of said degrees of freedom and outputs a sensor signal, wherein a representation of said sensor signal is provided to said host computer.

2. An interface device as recited in claim 1, wherein each of said flexible couplings may bend about only one rotational axis and may not twist.

3. An interface device as recited in claim 1 wherein said mechanism includes a first extension member, a first central member flexibly coupled to said first extension member, a second central member coupled to said first central member, and a second extension member flexibly coupled to said second central member, wherein said manipulandum is coupled to one of said central members.

4. An interface device as recited in claim 1 further comprising an actuator coupled to said mechanism, said actuator outputting a force that is applied to said manipulandum in one of said two degrees of freedom.

5. An interface device as recited in claim 3 wherein said two degrees of freedom are provided about two base axes of rotation, and wherein said central members rotate about two floating axes of rotation, and wherein said flexible couplings between said extension members and said central members are substantially aligned with said floating axes of rotation.

6. An interface device as recited in claim 5 wherein said unitary piece includes a ground member coupled to said ground, wherein said first and second extension members are flexibly coupled to said ground member by flexible couplings.

7. An interface device as recited in claim 6 wherein said flexible couplings between said ground member and said extension member are substantially aligned with said base axes of rotation.

8. An interface device as recited in claim 5 wherein said flexible coupling between said central members is substantially aligned with a normal axis extending approximately perpendicularly from a plane formed by said base axes when said central members are in an origin position.

9. An interface device as recited in claim 8 wherein said normal axis, said base axes, and said floating axes intersect approximately at a single point.

10. An interface device as recited in claim 1 wherein at least two of said flexible couplings are oriented such that when force is applied to said central members by said user contacting said manipulandum, a pulling tension is applied to said at least two flexible couplings.

11. An interface device manipulated by a user and providing input signals to a host computer, the interface device comprising:

a manipulandum physically contacted by said user and moveable in at least two rotary degrees of freedom;

a mechanism coupled to said manipulandum, said mechanism providing said at least two rotary degrees of freedom, wherein said mechanism includes five members forming a unitary piece, each of said members flexibly coupled to two other members by a flexure coupling such that flex provided by said flexure coupling allows said manipulandum to move in said rotary degrees of freedom; and a sensor coupled to said mechanism that senses a position of said manipulandum in at least one of said degrees of freedom and outputs a sensor signal, wherein a representation of said sensor signal is provided to said host computer.

12. An interface device as recited in claim 11 further comprising an actuator coupled to said mechanism, said actuator outputting a force that is applied to said manipulandum in one of said two degrees of freedom.

13. An interface device as recited in claim 11 wherein said mechanism includes a ground member that is grounded and flexibly coupled to a first extension member, a first central member flexibly coupled to said first extension member, a second central member flexibly coupled to said first central member, and a second extension member flexibly coupled to said second central member and flexibly coupled to said ground member.

14. An interface device as recited in claim 13 wherein said grounded member includes first and second sides arranged substantially perpendicular to each other in a single plane, wherein a first end of each of said extension members is coupled to said ground member by said flexible couplings, each of said flexible couplings extending along one of said sides of said ground member, and wherein a second end of each of said extension members is substantially aligned with said other side of said ground member on an axis of rotation of said manipulandum.

15. An interface device as recited in claim 14 wherein said central members each extend out of a plane formed by said axes of rotation of said manipulandum, wherein said flexible coupling joining said central members extends approximately perpendicularly to said plane formed by said axes of rotation.

16. An interface device as recited in claim 11 wherein said sensor is a rotary optical encoder.

17. An interface device as recited in claim 11 wherein said sensor is an analog potentiometer.

18. An interface device as recited in claim 11 wherein said sensor includes a planar detector and an emitter, wherein said planar detector is grounded and said emitter is coupled to one of said central members or to said manipulandum.

19. An interface device as recited in claim 11 wherein said members are flexibly coupled to each other by flexible couplings relatively thinner in the dimension allowing flex than in the dimensions in which said coupled members are to be rigid with respect to each other, wherein said flexible couplings allow bending and no twisting.

20. An interface device as recited in claim 19 wherein said flexible couplings are oriented so as to be in tension by said coupled members pulling said flexible couplings when weight is placed on said manipulandum.

21. An interface device as recited in claim 12 wherein said actuator is a first actuator, and further comprising a second actuator coupled to said gimbal mechanism, said actuators providing forces in said two degrees of freedom, wherein said actuators are rotary actuators having a limited rotational range.

22. An interface device as recited in claim 12 wherein said manipulandum includes one of a joystick handle and at least a portion of a sphere.

23. An interface device as recited in claim 22 wherein said interface device is in the form of a handheld gamepad and said computer is a home video console system or personal computer.

24. An interface device manipulated by a user and providing input signals to a host computer, the interface device comprising:
   a manipulandum physically contacted by said user and moveable in at least two rotary degrees of freedom;
   a mechanism coupled to said manipulandum, said mechanism providing said at least two rotary degrees of freedom about two axes of rotation, wherein said mechanism is a closed loop five-bar linkage including five members, one of said five members being a ground, wherein at least two flexure couplings are provided to couple at least some of said five members to each other to provide flex between said flexibly coupled members to allow said flexibly coupled members to bend with respect to each other, and wherein said flexibly coupled members form a unitary member;
   a sensor coupled to said mechanism that senses a position of said manipulandum in at least one of said degrees of freedom and outputs a sensor signal, wherein a representation of said sensor signal is provided to said host computer; and
   two actuators coupled to said mechanism and providing an output force on said manipulandum in said at least two rotary degrees of freedom.

25. An interface device as recited in claim 24 wherein said five members include said ground, a first extension member coupled to said ground, a first central member coupled to said first extension member, a second central member coupled to said first central member, and a second extension member coupled between said second central member and said ground.

26. An interface device as recited in claim 25 wherein one of said flexure couplings are provided between said first extension member and said first central member, and wherein another of said flexure couplings is provided between said second extension member and said second central member.

27. An interface device as recited in claim 26 wherein an additional flexure coupling is provided between said first and second central members.

28. An interface device as recited in claim 27 wherein an additional flexure coupling is provided between said ground and said first extension member, and another flexure coupling is provided between said ground and said second extension member.

29. An interface device as recited in claim 26 wherein said flexure couplings are substantially aligned with said axes of rotation and bend about said axes of rotation.

30. An interface device as recited in claim 24 wherein each of said flexure couplings bends about only one axis and does not allow twist.

31. An interface device as recited in claim 24 wherein each of said five members is flexibly coupled to two others of said five members such that said five members form a unitary member.

32. An interface device as recited in claim 24 wherein said flexure couplings are flexible joints that couple said at least some of said five members, said five members being rigid members.

33. A mechanism for providing two degrees of freedom to a manipulandum manipulated by a user, said mechanism included in a force feedback interface device in communication with a host computer, said force feedback interface device providing input signals to said host computer based on said manipulation and outputting forces on said manipulandum, the mechanism comprising:
   a ground member coupled to a ground;
   a first extension member flexibly coupled to said ground member by a first flexible coupling at a first end of said first extension member, said first extension member rotatable about a first axis of rotation extending through said first flexible coupling;
   a second extension member flexibly coupled to said ground member by a second flexible coupling at a first end of said second extension member, said second extension member rotatable about a second axis of rotation extending through said second flexible coupling;
   a first central member flexibly coupled to a second end of said first extension member by a third flexible coupling at a first end of said first central member; and a second central member flexibly coupled to a second end of said second extension member by a fourth flexible coupling at a first end of said second central member, wherein a second end of said second central member is rotationally coupled to a second end of said first central member.

34. A mechanism as recited in claim 33 wherein said rotational coupling between said central members is a fifth flexible coupling.

35. A mechanism as recited in claim 34 wherein said third flexible coupling is aligned with a floating rotational axis that is aligned with said first axis of rotation, and wherein said fourth flexible coupling is aligned with a floating rotational axis aligned with said second axis of rotation.

36. A mechanism as recited in claim 33 wherein said rotational coupling between said central members is a rotary bearing.

37. A mechanism as recited in claim 33 wherein said ground member, first extension member, second extension member, first central member, and second central member form a unitary member formed from a single mold.

* * * * *